US011869314B2

(12) United States Patent
He et al.

(10) Patent No.: US 11,869,314 B2
(45) Date of Patent: Jan. 9, 2024

(54) COUNTDOWN TIMER TO INITIATE AUTOMATED TRANSFER ACTION

(71) Applicant: IGT, Las Vegas, NV (US)

(72) Inventors: Fang He, Beijing (CN); Kun Wang, Beijing (CN); Bo Cheng, Beijing (CN)

(73) Assignee: IGT, Las Vegas, NV (US)

( * ) Notice: Subject to any disclaimer, the term of this patent is extended or adjusted under 35 U.S.C. 154(b) by 257 days.

(21) Appl. No.: 17/213,416

(22) Filed: Mar. 26, 2021

(65) Prior Publication Data

US 2022/0309878 A1 Sep. 29, 2022

(51) Int. Cl.
*G07F 17/32* (2006.01)

(52) U.S. Cl.
CPC ...... *G07F 17/3269* (2013.01); *G07F 17/3237* (2013.01); *G07F 17/3244* (2013.01)

(58) Field of Classification Search
CPC ............. G07F 17/3269; G07F 17/3237; G07F 17/3244; G07F 17/34
USPC ............................................................ 463/25
See application file for complete search history.

(56) References Cited

U.S. PATENT DOCUMENTS 6,939,223 B1 * 9/2005 Jones .................. G07F 17/3244 463/16
8,147,334 B2 4/2012 Gatto et al.
8,764,566 B2 7/2014 Miltenberger et al.
2004/0082384 A1 * 4/2004 Walker ................ G07F 17/3239 463/40
2004/0102238 A1 * 5/2004 Taylor ..................... G07F 17/32 463/16
2004/0242307 A1 * 12/2004 Laakso ............... G07F 17/3281 463/16
2007/0254732 A1 * 11/2007 Walker ................ G07F 17/3244 463/16
2012/0238352 A1 * 9/2012 Wallens ................. G06Q 40/04 463/25
2019/0102985 A1 * 4/2019 Higgins .............. G07F 17/3223

* cited by examiner

*Primary Examiner* — Reginald A Renwick
(74) *Attorney, Agent, or Firm* — Sheridan Ross P.C.

(57) ABSTRACT

The present disclosure relates generally to gaming devices, systems, and methods. An illustrative method includes establishing a gaming session between a player and a gaming device, determining that a predetermined condition has been met during the gaming session, and automatically displaying a prompt to the player via a user interface of the gaming device, where the prompt provides an indication that an automated transfer event will occur a predetermined amount of time after displaying the prompt with respect to a credit meter being used to conduct the gaming session at the gaming device and where the prompt is displayed in response to determining that the predetermined condition has been met during the gaming session.

20 Claims, 13 Drawing Sheets

COUNTDOWN TIMER TO INITIATE AUTOMATED TRANSFER ACTION

BACKGROUND

The present disclosure is generally directed to gaming machines and gaming systems and, in particular, enhanced features provided by gaming machines and gaming systems.

Electronic gaming machines (EGMs) traditionally facilitated gameplay with a single game, such as video poker, a slot game, keno, or the like. Some newer EGMs allow the player to choose from a number of games. Most games require a player to deposit funds into the EGM before gameplay is allowed. Some EGMs are equipped with a credit meter to track a number of credits available to the player for additional gameplay.

BRIEF SUMMARY

In certain embodiments, the present disclosure relates to an electronic gaming device, a method, and a system. In some embodiments, a gaming device is provided, including: a processor; a user interface coupled with the processor; and a memory coupled with the processor and storing therein instructions that, when executed by the processor, cause the processor to: determine, at a first time, that a predetermined condition has been met during a gaming session established between a player and the gaming device; in response to determining that the predetermined condition has been met during the gaming session, automatically display a prompt to the player via the user interface, where the prompt provides an indication that an automated transfer event will occur a predetermined amount of time after the first time with respect to a credit meter being used to conduct the gaming session at the gaming device; initiate a timer device to track an elapsed time relative to the first time; determine, with the timer device, that the elapsed time equals the predetermined amount of time; and in response to determining that the elapsed time equals the predetermined amount of time, trigger the automated transfer event to occur.

In some embodiments, a method is provided, including: establishing a gaming session between a player and a gaming device; determining, with a processor, that a predetermined condition has been met during the gaming session; in response to determining that the predetermined condition has been met during the gaming session, automatically displaying a prompt to the player via a user interface of the gaming device, wherein the prompt provides an indication that an automated transfer event will occur a predetermined amount of time after displaying the prompt with respect to a credit meter being used to conduct the gaming session at the gaming device; determining, with the processor, that the predetermined amount of time has passed since displaying the prompt; and in response to determining that the predetermined amount of time has passed since displaying the prompt, automatically initiating a transfer event.

In some embodiments, a system is provided, including: a processor and a memory, coupled with the processor, including instructions that are executable by the processor, where the instructions include instructions that: determine, at a first time, that a predetermined condition has been met during a gaming session established between a player and a gaming device; automatically display a prompt to the player via the user interface in response to determining that the predetermined condition has been met during the gaming session, where the prompt provides an indication that an automated transfer event will occur a predetermined amount of time after the first time with respect to a credit meter being used to conduct the gaming session at the gaming device; track an elapsed time relative to the first time; determine that the elapsed time equals the predetermined amount of time; and implement the automated transfer event in response to determining that the elapsed time equals the predetermined amount of time.

Additional features and advantages are described herein and will be apparent from the following Description and the figures.

DETAILED DESCRIPTION

Figure 1:
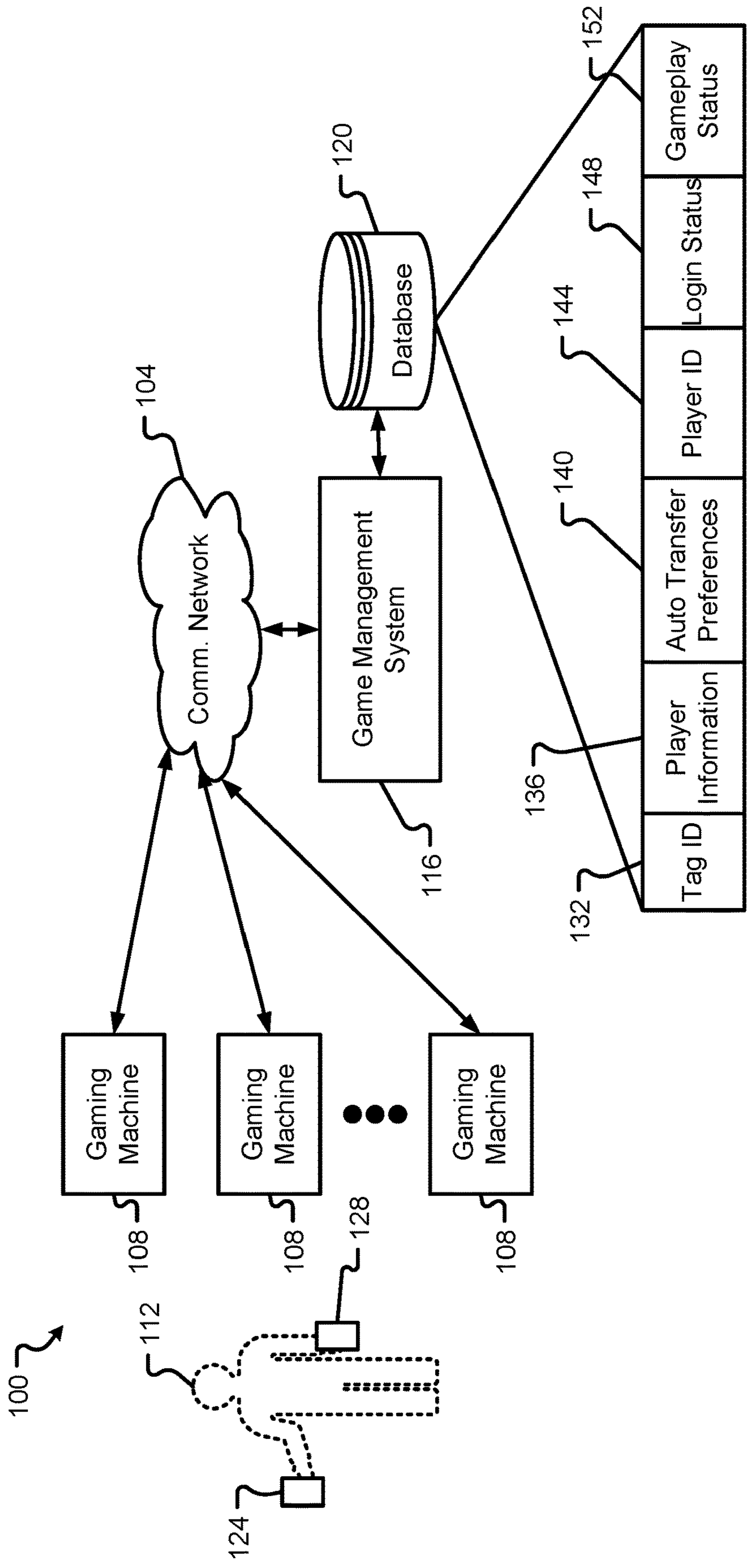
FIG. 1 is a block diagram of a system in accordance with embodiments of the present disclosure.

Embodiments of the present disclosure will be described in connection with a gaming session established between a player and a game. Certain examples of games will be described as games traditionally offered at an EGM (e.g., video poker, slots, keno, etc.). It should be appreciated, however, that embodiments of the present disclosure may be applied to games other than traditional EGM games. Other examples of games that may be improved with the automated transfer features described herein include, without limitation, sports wagering, games of skill, games of chance, combination games of skill/chance, lottery games, video games, or any other type of game that tracks player credit to be used toward playing the game. Furthermore, because embodiments of the present disclosure can apply to any type of game or combinations of games, it should be appreciated that embodiments of the present disclosure may be implemented in an EGM, a mobile device, or any other gaming device that is configured to facilitate a gaming session between a player and a game.

During gameplay, the amount of credit available to the player may decrease over time, especially if the player is losing more than they are winning. Once credit available to the player is completely consumed (e.g., as tracked by a credit meter), the player has traditionally been required to transfer additional credit or funds to the machine to support further gameplay. Most often the player is required to card-in again, insert more coins, insert more bills, tap an "add credit" button, or perform some other overt action signifying that they want to add to their available credits when the available credits have been consumed. This additional action required of the player can frustrate the player's enjoyment of the game and may require the player to restart a gaming session rather than continuing their existing gaming session. Such requirements may drive the player to discontinue playing the game.

There are other scenarios where a player may want to limit or restrict themselves from playing a gaming session for too long or from contributing too many credits to a particular game. As an example, a player may start a gaming session with the intention of limiting their gaming session to ten minutes or less. But as the player becomes further immersed in the game, the player may lose track of time and play much longer than originally desired.

Embodiments of the present disclosure provide a solution to the above-identified problems associated with existing games and interactions between players and games. In some embodiments, a physical device is provided to a player to allow the player to define and control an automated transfer event, which will be invoked during a gaming session in which the player is involved. For example, the player may be provided with a mobile device or player card that has some automated transfer preferences stored in memory. The automated transfer preferences may be provided to a gaming device that is hosting a game and enabling a gaming session between the player and the game. These automated transfer preferences may be obtained prior to or as part of initiating the gaming session between the player and the game. In the absence of obtaining the automated transfer preferences, the gaming session may be run in the normal fashion and the player may be required to coin-in, card-in, or perform some other overt action to increase available credits and/or to transfer credits out of the credit meter of the gaming device.

The gaming device may be configured to convert the automated transfer preferences into automated transfer rules that are invoked by the gaming device during the gaming session. In some embodiments, the automated transfer rules may be referenced by the game or the gaming device hosting the game. The automated transfer rules may be used to identify when a predetermined condition has been met during the gaming session and then, in response to determining the predetermined condition has been met, provide a prompt to the player that an automated transfer event will occur a predetermined amount of time after the predetermined condition was met. The automated transfer rules may then initiate a timer to track the amount of time that elapses after the predetermined condition was met. If the player does not cancel or otherwise indicate a desire to cancel the automated transfer event before the timer expires (e.g., the predetermined amount of time passes), then the gaming device may automatically initiate the automated transfer event. In this way the player is able to set preferences to define, ahead of beginning a gaming session, the parameters associated with the automated transfer event and the predetermined amount of time required to elapse before the automated transfer event is automatically initiated.

In some embodiments, the automated transfer event may include transferring additional credits from an external source (e.g., a linked player account, a player's line of credit, a mobile wallet on a player's mobile device, etc.) into the credit meter of the gaming device. In some embodiments, the automated transfer event may include transferring available credits from the credit meter of the gaming device into an external source (e.g., a linked player account, a player's line of credit, a mobile wallet on a player's mobile device, etc.).

An advantage of implementing an automated transfer process as described herein is that the automated transfer process and the timer associated therewith may be presented to the player in a visual manner that obtains the player's attention during the gaming session but does not necessarily disrupt the gaming session itself. As an example, the gaming session and graphics associated therewith may continue and be displayed to the player even when a GUI element for the timer is presented to the player. The player can choose to ignore the notification provided by the GUI element, thereby resulting in the automated transfer process occurring without any additional input required by the player. Illustratively, the player may be allowed to continue with their gaming session and not interact with the GUI element associated with the automated transfer process. However, because the timer is presented to the player, there is still an opportunity for the player to cancel or interrupt the automated transfer process, if desired. Alternatively or additionally, the player may elect to interact with the GUI element to initiate the automated transfer process immediately (e.g., before the timer expires). Advantageously, the parameters of the automated transfer process may have been defined by the player prior to receiving the notification, which means the player can simply press an "accept" button that will automatically initiate the automated transfer process with the predefined parameters.

As will be described herein, the player may predefine or provide their automated transfer processes to the device hosting the game before a gaming session is initiated. The preferences may be stored in connection with a player profile or may be defined by the player during a login process. Illustratively, the player may log into the device using a physical card or mobile application on a mobile device.

These and other advantages will now be described with further reference to the figures.

Gaming System

With reference initially to FIG. 1, details of an illustrative gaming system 100 will be described in accordance with at least some embodiments of the present disclosure. The components of the system 100, while depicted as having particular instructions and devices, are not necessarily limited to the examples depicted herein. Rather, a system 100 according to embodiments of the present disclosure may include one, some, or all of the components depicted in the system 100 and does not necessarily have to include all of the components in a single device.

The gaming system 100 is shown to include one or more communication networks 104 that interconnect and facilitate machine-to-machine communications between one or multiple gaming machines 108, one or more mobile devices 124, and a game management system 116. As will be described in further detail herein, the game management system 116 may include one or multiple servers that are configured to facilitate gameplay and/or other functions of the system 100.

It should be appreciated that a communication network 104 may correspond to one or many communication networks without departing from the scope of the present disclosure. In some embodiments, the gaming machines 108, mobile devices 124, and game management system 116 may be configured to communicate using various nodes or components of a communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming machines 108 may be distributed throughout a single property or premises (e.g., a single casino floor) or the gaming machines 108 may be distributed among a plurality of different properties. In a situation where the gaming machines 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 108 may utilize the same or different types of communication protocols to connect with the communication network 104. It should also be appreciated that the gaming machines 108 may or may not present the same type of game or wagering interface to a player 112. For instance, a first gaming machine 108 may correspond to a gaming machine that presents a slot game to the player 112, the second gaming machine 108 may correspond to a sports betting terminal, and other gaming machines 108 may present other types of games or a plurality of different games for selection and eventual play by a player 112. It may be possible for the some of the gaming machines 108 to communicate with one another via a communication network 104.

A gaming machine 108 may correspond to a type of device that enables player interaction in connection with making wagers, communicating, watching live competitive contests, playing games of chance, and/or playing games of skill. For instance, the gaming machines 108 may correspond to a type of device that enables a first player 112 to interact with a second player 112 at respective gaming machines 108. In other embodiments, each player 112 may be enabled to play a game individually at a gaming machine 108.

As will be discussed in further detail herein, a player 112 may be allowed to carry a mobile device 124 and/or a credential 128. The mobile device 124 may correspond to a mobile communication device such as a cellular phone, a smart phone, a laptop, a tablet, a wearable device, etc. As will be discussed in further detail herein, a mobile device 124 may also be configured to facilitate gameplay with a player 112. In other words, components depicted and described as being included in a gaming machine 108 may also be included in a mobile device 124 without departing from the scope of the present disclosure.

In some embodiments, the credential 128 may correspond to a player loyalty card, a player tag, a wristband, a wearable device, or any other device that can be used by the player 112 to indicate their identity to a gaming machine 108 and/or provide player preferences (e.g., automated transfer preferences field 140) to a gaming machine 108. Although the player 112 is depicted as carrying two physically separate devices (e.g., a mobile device 124 and a credential 128), it should be appreciated that the player 112 may carry a single device that provides the combined functionality of a mobile device 124 and a credential 128. In other words, a mobile device 124 may be considered a credential 128 or include components of a credential 128 without departing from the scope of the present disclosure. Presentation of a mobile device 124 and/or credential 128 to a gaming machine 108 may enable the player 112 to create a player account, login or register their presence at a particular gaming machine 108 with respect to the game management system 116, provide gameplay preferences to the gaming machine 108, etc. As will be discussed in further detail herein, one or more of the credentials 128 may be used to log the player 112 into a game management system 116 in addition to enabling the player 112 to share automated transfer preferences field 140, link a player account or financial account with a gaming machine 108, and enable automated transfer events at the gaming machine 108.

A player 112 does not necessarily need to carry a mobile device 124 and credential 128 to login to the gaming machine 108, share automated transfer preferences with the gaming machine 108, link a player account or financial account with the gaming machine 108, etc. Rather, some or all of these automated transfer events may be facilitated by the gaming machine 108 alone. Alternatively or additionally, an automated transfer event may have a condition associated therewith that requires the mobile device 124 and/or credential 128 to be paired with the gaming machine 108 (e.g., indicating that the mobile device 124, credential 128, and/or player 112 are within a predetermined proximity of the gaming machine 108).

In some embodiments, a player 112 may login to the game management system 116 by presenting their mobile device 124 and/or credential 128 to a gaming machine 108, which causes components of the gaming machine 108 to initiate a login process with the game management system 116 on behalf of the player 112. Upon logging into the game management system 116, the gaming machine 108 may retrieve one or more player 112 gameplay preferences from the game management system 116 for use during a gaming session with the player 112. In some embodiments, the gaming machine 108 may retrieve automated transfer preferences stored in the automated transfer preferences field 140 from the game management system 116 and the automated transfer preferences stored in the automated transfer preferences field 140 may be used as part of implementing an automated transfer event in accordance with preferences that were previously-defined by the player 112 (e.g., defined by the player 112 prior to the player 112 logging into the gaming machine 108 and/or prior to the player 112 initiating a gaming session with the gaming machine 108).

In some embodiments, the game management system 116 may correspond to a system used within a casino to manage slot games, video poker games, bingo games, keno games, or the like that are played on one or more of the gaming machines 108. Alternatively or additionally, the game management system 116 may correspond to a system used within the casino to manage sports wagers placed by players 112 either at a sports desk or at a gaming machine 108. It should be appreciated that the game management system 116 may include one or multiple servers that execute instructions in connection with managing the games or wager capabilities made available at the gaming machines 108. It should also be appreciated that the game management system 116 may include one or multiple servers that execute instructions in connection with managing the generation, distribution, and usage of shareable codes.

The act of logging into the game management system 116 may enable the player 112 to receive additional playing benefits (e.g., loyalty benefits), maintain or track wager activity, purchase additional wager or gameplay credits, enable automated transfer events during a gaming session, and the like. Furthermore, if a player account does not exist for the player 112 within a particular game management system 116, then the gaming machine 108 and/or mobile device 124 may be configured to facilitate the creation of a player account for the player 112 within the game management system 116. The creation of the player account within any particular game management system may or may not utilize at least some of the information also used to log the player 112 into their other player account established with another game management system.

As shown in FIG. 1, the game management system 116 may utilize one or more databases 120 to track player 112 activity with respect to the gaming machine 108, with respect to transfer events (automated or manual), and the like. For instance, if the game management system 116 corresponds to a Patron Tracking System (PTS), then games played at the gaming machines 108, credits wagered in a slot game, credits won in a slot game, credits transferred into the gaming machine 108, credits transferred out of the gaming machine 108, etc. may correspond to the types of player 112 activities tracked by the game management system 116. Similarly, the game management system 116 may utilize the database 120 to track player 112 activity with respect to sports wagers, lottery games, games of skill, and the like.

The illustrative database 120 is shown to include data fields used to track player 112 activity with respect to games of chance, games of skill played, sports wagering games, as well as information associated with transfer events and preferences. The illustrative, but non-limiting, data fields may include a tag ID field 132, a player information field 136, an automated transfer preferences field 140, a player ID field 144, a login status field 148, and a gameplay status field 152. The tag ID field 132 may correspond to a field used to store an identification number or string that uniquely identifies a credential 128, mobile device 124, or application on a mobile device 124 carried by the player 112 from among other devices used by other players 112. The format of the identification number or string used to in the tag ID field 132 may be specific to the game management system 116 and can correspond to any alphanumeric sequence or any length (e.g., 1 bit, 2 bits, . . . N bits).

The player information field 136 may be used to store information describing a player 112 with respect to the game management system 116. For instance, the player information field 136 may be used to store information describing whether or not the player 112 has a loyalty status with a particular casino, has downloaded a particular application on their mobile device 124, whether the player 112 is a VIP within the casino, historical gameplay information for the player 112 (e.g., casino visit times, durations, winnings, losses, etc.). In some embodiments, the information maintained in the player information field 144 may be unique to particular games played by the player 112 at gaming machines 108 and may describe the types of games historically played by the player 112.

The automated transfer preferences field 140 may be used to store default preferences or player-defined preferences that can be used during a gaming session to initiate and execute automated transfer events. In some embodiments, the automated transfer preferences field 140 may include a description of predetermined amount(s) of time between automated transfer events, predetermined conditions that may trigger an automated transfer event, predetermined amount(s) of time between a predetermined condition that triggers an automated transfer event and when the automated transfer event should be executed, display preferences to be used in connection with displaying a timer or automated transfer events, preferences for cancelling or delaying an automated transfer event, account(s) to link to a credit meter/gaming machine 108 to implement an automated transfer event, default conditions to apply to an automated transfer event, etc. It should be appreciated that the automated transfer preferences field 140 may be populated by the player 112, by a casino operating the gaming machine 108, by a maker of a game implemented at the gaming machine 108, or combinations thereof.

The player ID field 144 may be used to store an identification number or string that uniquely identifies the player 112 from among other players. As an example, the player ID field 144 may store a player loyalty identification number and may have a particular format associated therewith (e.g., a required length, a number of bits, permissible symbols, etc.) In some embodiments, the player ID assigned to a player 112 may be uniquely assigned by a casino that administers the game management system 116.

The login status field 148 may be used to store a current status gameplay status of a player 112. Illustratively, the login status field 148 may indicate whether the player 112 is currently logged into a particular gaming machine 108, whether the player 112 is located at a particular premises/casino, whether the player 112 is currently involved in a gaming session, whether the player 112 is using a mobile device 124 to participate in a gaming session, whether a mobile device 124 of the player 112 is currently paired with a gaming machine 108, or any other information that describes whether or not a player 112 is involved or may be involved in a gaming session that could utilize an automated transfer event.

The gameplay status field 152 may be used to store information describing a player's 112 gameplay status at a gaming machine 108. For instance, the gameplay status field 152 may store information describing wager history, credit in information, credit out information, duration of a gaming session with a particular gaming machine 108, and other information that is known to be tracked by the game management system 116.

As mentioned above, a gaming machine 108 may include any type of known device such as a slot machine, a sports wagering terminal, an electronic table game (e.g., video poker), a skill-based game, etc. The gaming machine 108 can be in the form of an EGM, virtual gaming machine, video game gambling machine, etc. Similarly, a mobile device 124 may be configured to facilitate gameplay or gaming sessions between the player 112 and a game. In some embodiments, a player 112 may use their mobile device 124 and/or a gaming machine 108 to participate in a gaming session and utilize an automated transfer event. Details of gameplay, gaming sessions, and automated transfer events will be described as being facilitated by a computational device, which may include a gaming machine 108, a mobile device 124, and/or any other suitable machine that contains the components and provides the functions described herein.

Gaming Device

Figure 2:
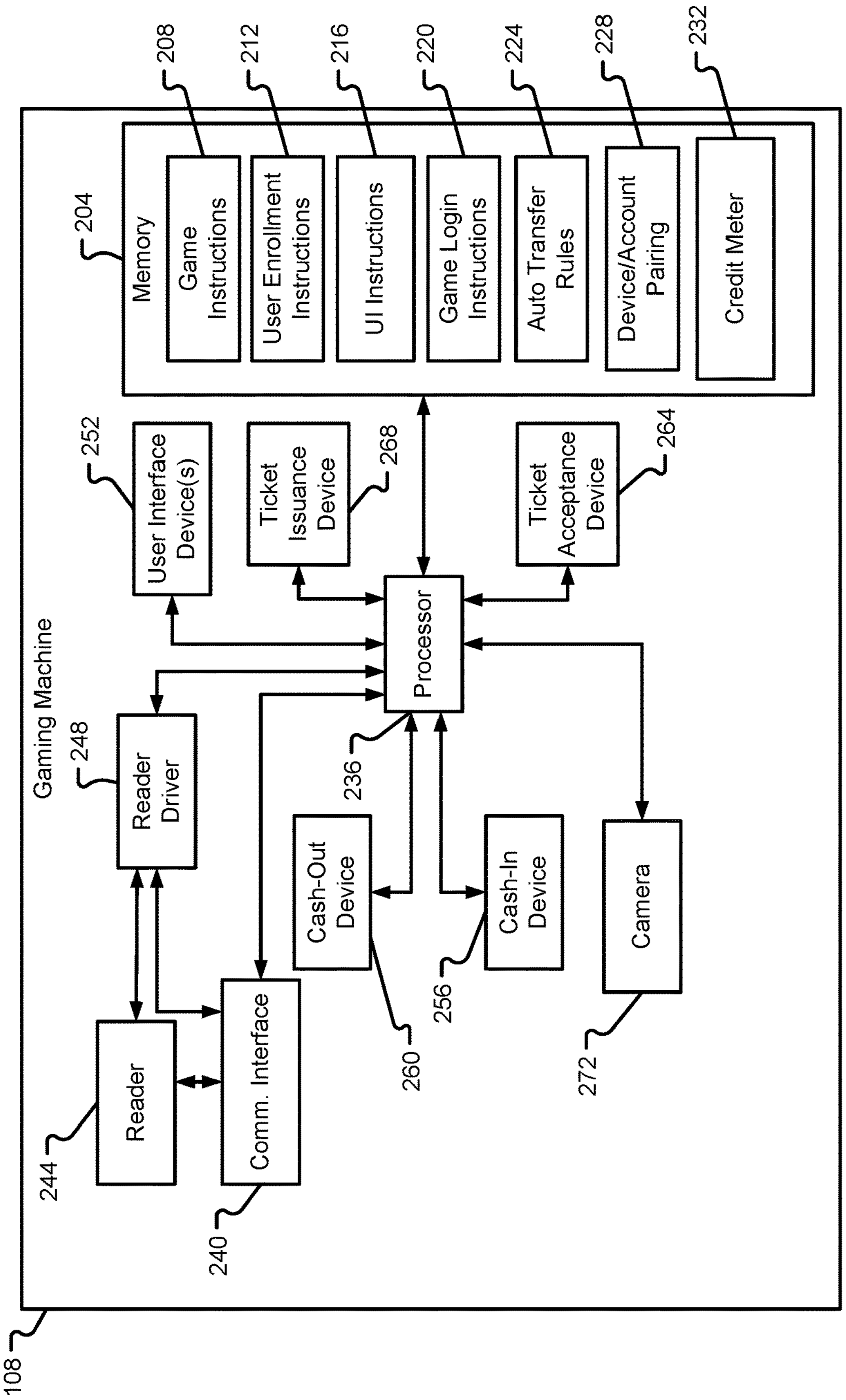
FIG. 2 is a block diagram depicting details of a gaming machine in accordance with embodiments of the present disclosure.
Figure 3:
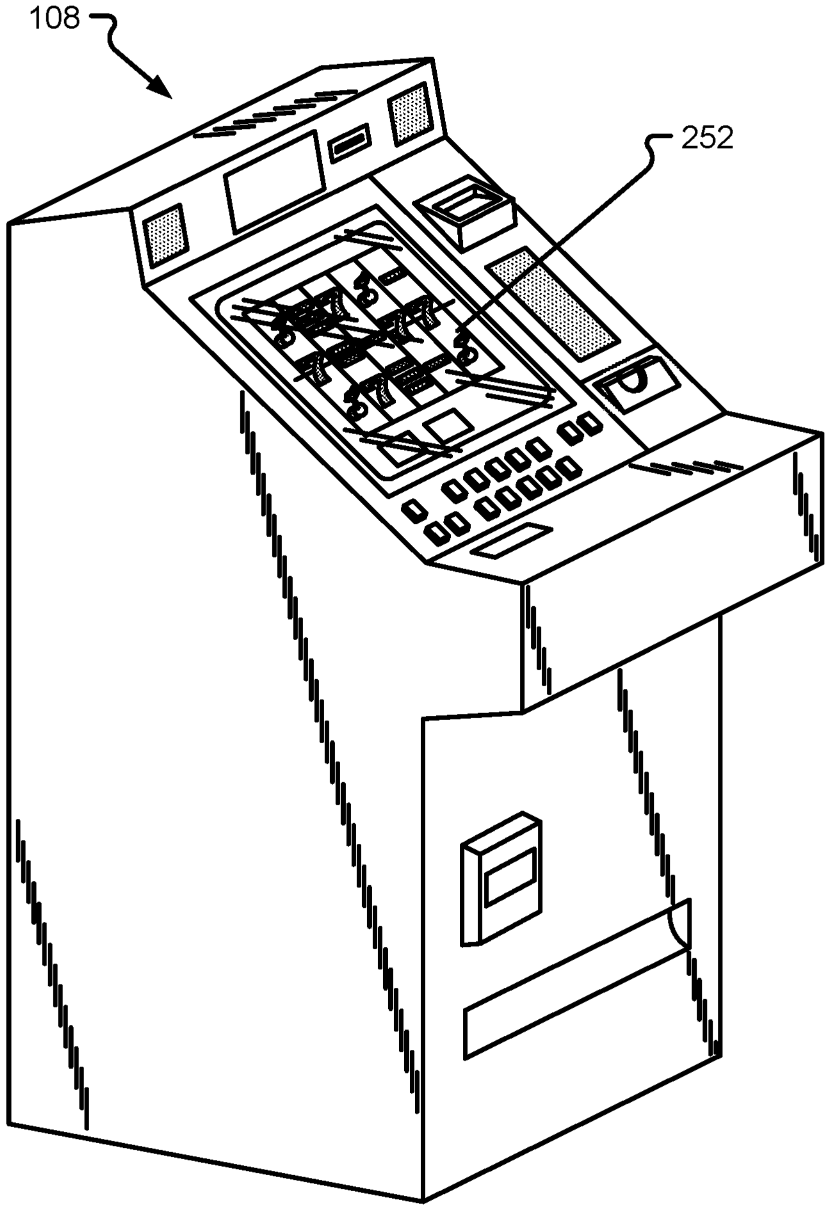
FIG. 3 illustrates an example gaming machine in accordance with embodiments of the present disclosure.
Figure 4:
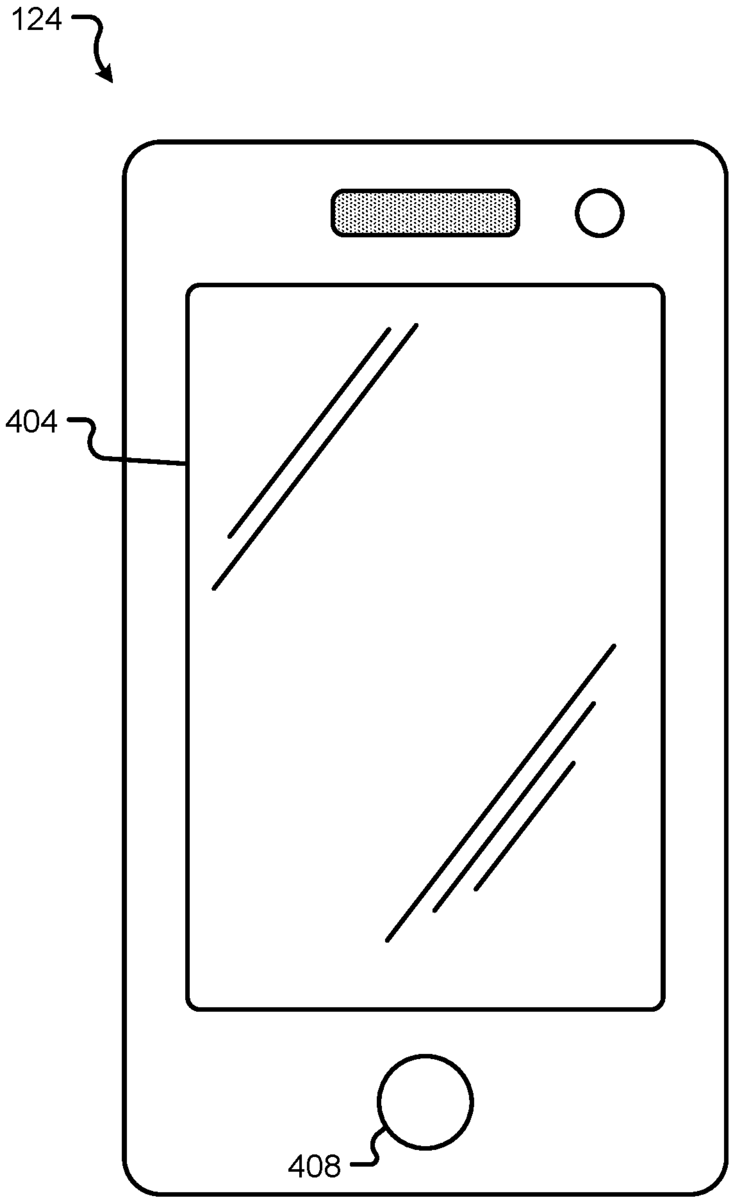
FIG. 4 illustrates an example gaming device in accordance with embodiments of the present disclosure.

With reference now to FIGS. 2-4, additional details of gaming devices, such as a gaming machine 108 and/or a mobile device 124, will be described in accordance with at least some embodiments of the present disclosure. Referring initially to FIG. 2, while depicted as a gaming machine 108, it should be appreciated that some or all of the components of a single gaming machine 108 may be distributed across multiple gaming machines 108 (of the same or different type) without departing from the scope of the present disclosure. It should also be appreciated that one or more features of a gaming machine 108 may be provided in a player's 112 mobile device 124 without departing from the scope of the present disclosure.

The gaming machine 108 is shown to include memory 204, a processor 236, a communication interface 240, a reader 244, a reader driver 248, a cash-in device 256, a cash-out device 260, a ticket acceptance device 264, a ticket issuance device 268, one or more user interface devices 252, and a camera 272 (which may be used to ensure a player 112 is positioned in front of the gaming machine 108 as a condition/requirement associated with implementing an automated transfer event).

The processor 236 may include one or multiple computer processing devices. In some embodiments, the processor 236 may include a microprocessor, a Central Processing Unit (CPU), a Graphics Processing Unit (GPU), a microcontroller, or the like. The processor 236 may also be configured to execute one or more instructions stored in memory 204.

The memory 204 may include one or multiple computer memory devices that are volatile or non-volatile. Non-limiting examples of memory 204 include Random Access Memory (RAM), Read Only Memory (ROM), flash memory, Electronically-Erasable Programmable ROM (EEPROM), Dynamic RAM (DRAM), etc. The memory 204 may be configured to store instructions that enable player 112 interaction with the gaming machine 108, that enable the gaming machine 108 to interact with the game management system 116, that enable the player 112 to create a player account with the game management system 116, that enable the gaming machine 108 to provide a player 112 with the ability to login to the game management system 116, enable the player 112 to define automated transfer preferences field 140, and/or enable the gaming machine 108 to implement automated transfer events. Examples of instructions that may be stored in the memory 204 include game instructions 208, user enrollment instructions 212, User Interface (UI) instructions 216, game login instructions 220, and device/account pairing instructions 228. The memory 204 may also include rules or the like that are implemented/referenced by the instructions. For example, the memory 204 may include automated transfer rules 224 that are referenced by the game instructions 208 as part of triggering and implementing automated transfer events.

The game instructions 208, when executed by the processor 236, may enable the gaming machine 108 to facilitate one or more games of chance or skill and produce interactions between the player 112 and the game of chance or skill. In some embodiments, the game instructions 208 may include subroutines that present one or more graphics to the player 112 via a user interface device 252, subroutines that calculate whether a particular game wager has resulted in a win or loss during the game of chance or skill, subroutines for determining payouts for the player 112 in the event of a win, subroutines for exchanging communications with the game management system 116 via the communication interface 240, and any other subroutine or set of instructions that facilitate gameplay at or in association with the gaming machine 108. Alternatively or additionally, the game instructions 208 may include instructions that enable the player 112 to place wagers on sporting events, watch live sporting events via the gaming machine 108, track a status of wagers placed on sporting events, track a status of events occurring in sporting events, and the like.

The user enrollment instructions 212, when executed by the processor 236, may enable the gaming machine 108 to interact with the player 112 for purposes of enrolling the player 112 with the game management system 116, for purposes of enabling the player 112 to link a player account or financial account with the gaming machine 108 to enable automated transfer events, and/or for the purposes of enabling the player 112 to define automated transfer preferences stored in the automated transfer preferences field 140 or automated transfer rules 224.

The UI instructions 216, when executed by the processor 236, may enable the gaming machine 108 to render or present various information and prompts to the player 112 via one or more user interface device(s) 252 of the gaming machine 108. For instance, the UI instructions 216 may enable the gaming machine 108 to present prompts to the player 112 via the one or more user interface device(s) 252, receive inputs from the player 112, display a timer device to the player 112, or combinations thereof. Examples of user interface device(s) 252 include, without limitation, user input devices (e.g., buttons, microphones, touch-sensitive sensors, optical sensors, motion sensors, proximity sensors, etc.), user output devices (e.g., display screens, lights, speakers, haptic feedback devices, etc.), and combination user input/output devices (e.g., touch-sensitive displays, etc.). The UI instructions 216 may also include drivers for the user interface device(s) 252 and/or other firmware that enables control of the user interface device(s) 252 in accordance with inputs received from other instructions stored in memory 204.

The game login instructions 220, when executed by the processor 236 and/or reader driver 248 and/or communication interface 240, may enable the gaming machine 108 to initiate a login process for a player 112 with the game management system 116. In some embodiments, the login process for the game management system 116 may be initiated automatically in response to a card read event occurring at the reader 244. In some embodiments, the login process for the game management system 116 may be initiated in response to registering a credential read event at the reader 244. Alternatively or additionally, the login process for the game management system 116 may be initiated in response to reading data from the mobile device 124 and/or credential 128 and confirming a validity of the data read from the mobile device 124 and/or credential 128.

The device/account pairing instructions 228, when executed by the processor 236, may enable the gaming machine 108 to pair with a mobile device 124 (e.g., Bluetooth pairing, NFC pairing, WiFi pairing, optical pairing, etc.). Alternatively or additionally, the device/account pairing instructions 228 may be used to link or pair the gaming device 108 with a player account or financial account defined by the player 112 for purposes of implementing an automated transfer event. For example, the player 112 may define an account from which funds, electronic credits, vouchers, or the like can be extracted and then added to the credit meter 232 (e.g., during a credit transfer-in event). Alternatively or additionally, the player 112 may define an account to which funds, electronic credits, vouchers, or the like can be provided from the credit meter 232 (e.g., during a credit transfer-out event). The account(s) identified for purposes of implementing a credit transfer-in event do not necessarily need to be the same as the account(s) identified for purposes of implementing a credit transfer-out event. However, it is also possible that a single account can be linked with the gaming machine 108 for purposes of facilitating automated credit transfer-in and transfer-out events. The account(s) may include credit card accounts, player credit accounts, financial accounts, pre-funded accounts, lines of credit, etc. Alternatively or additionally, an account may correspond to any suitable external financial source (e.g., a linked player account, a player's line of credit, a mobile wallet on a player's mobile device 124, etc.). As will be described in further detail herein, the automated transfer event may include transferring available credits from the credit meter 232 of the gaming machine 108 into or out of an external financial source (e.g., a linked player account, a player's line of credit, a mobile wallet on a player's mobile device 124, etc.).

The credit meter 232 may correspond to a device or collection of devices that facilitates a tracking of wager activity or available wager credits at the gaming machine 108. Such credits may be made available for wagers or bets placed on a game managed by the game management system 116. In some embodiments, the credit meter 232 may be used to store or log information related to various player 112 activities and events that occur at the gaming machine 108. The types of information that may be maintained in the credit meter 232 include, without limitation, player information, available credit information, wager amount information, and other types of information that may or may not need to be recorded for purposes of accounting for wagers placed at the gaming machine 108 and payouts made for a player 112 during a game of chance or skill played at the gaming machine 108. In some embodiments, the credit meter 232 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 108, and the like. Some or all of the data within the credit meter 232 may be reported to the game management system 116. As an example, the number, value, and timing of wagers placed by a particular player 112 and payouts on such wagers may be reported. The credit meter 232 may also be used to store information related to automated transfer events, including amounts of credits transferred, accounts to which the credit meter 232 was linked during the transfer, whether a transfer event was an automated transfer event or a manual transfer event, etc.

The cash-in device 256 may include a bill acceptor, a coin acceptor, a chip acceptor or reader, or the like. In some embodiments, the cash-in device 256 may also include credit card reader hardware and/or software. The cash-out device 260 may operate and issue cash, coins, tokens, or chips based on an amount indicated within the credit meter 232. In some embodiments, the cash-out device 260 may include a coin tray or the like and counting hardware configured to count and distribute an appropriate amount of coins or tokens based on a player's 112 winnings or available credit within the credit meter 232.

The gaming machine 108 may also be provided with a ticket acceptance device 264 that is configured to accept or scan physically-printed tickets/vouchers and extract appropriate information therefrom. In some embodiments, the ticket acceptance device 264 may include one or more machine vision devices (e.g., a camera, IR scanner, optical scanner, barcode scanner, etc.), a physical ticket acceptor, a shredder, etc. The ticket acceptance device 264 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 112 mobile device 124, for example.

The ticket issuance device 268 may be configured to print or provide physical tickets/vouchers to players 112. In some embodiments, the ticket issuance device 268 may be configured to issue a ticket/voucher consistent with an amount of credit available to a player 112, possibly as indicated within the credit meter 232.

As mentioned above, the user interface device(s) 252 may correspond to any type of mechanical or software-based input and/or output device. In some embodiments, the user interface device(s) 252 may be provided on a common panel or portion of the gaming machine 108 and may be used to initiate a predetermined function in response to being pressed by the player 112. In addition to the examples of user interface devices 252 described above, it should be appreciated that a user interface device 252 may alternatively or additionally take the form of one or more depressible buttons, a lever or "one armed bandit handle," etc. One example of a user interface device 252 is shown in FIG. 3. As mentioned, the user interface device(s) 252 may include a visual display device, touch-sensitive user input devices, buttons, speakers, the camera 272, or the like.

The illustrative gaming machine 108 is also shown to include a communication interface 240. In the depicted embodiment, the reader 244 is in direct communication with the communication interface 240. It should be appreciated, however, that such a direct connection is not required. Rather, for example, the reader 244 may be directly connected to the processor 236. In some embodiments, the communication interface 240 may correspond to a component of the gaming machine 108 that has the reader 244 integrated therewith. As a more specific but non-limiting example, the communication interface 240 may correspond to a SMIB and the reader 244 may be integrated with the SMIB. In some embodiments, the communication interface 240 communicates with the processor 236 using a Slot Accounting System (SAS) protocol. The communication interface 240 may enable the gaming machine 108 to interact with the game management system 116. All elements of the gaming machine 108 may be considered to be coupled to one another, regardless of whether or not such coupling is direct or indirect. For instance, the processor 236 may be considered to be coupled to the reader 244 via the communication interface 240. In other words, "coupling" as used herein does not necessarily require a direct communication between components.

The nature of the communication interface 240 may depend upon the protocol and/or networking requirements of the game management system 116. Examples of a suitable communication interface 240 include, without limitation, an Ethernet port, a USB port, an RS-232 port, an RS-485 port, a NIC, an antenna, a driver circuit, a modulator/demodulator, etc. The communication interface 240 may include one or multiple different network interfaces depending upon whether one or multiple network connections are required to facilitate interactions with the game management system 116 or the network 104. For instance, the gaming machine 108 may be provided with both a wired network interface and a wireless network interface without departing from the scope of the present disclosure. In some embodiments, the communication interface 240 may include different communications ports that interconnect with various input/output lines.

The reader 244 may be configured to read credentials 128 of different types. For instance, the reader 244 may be configured to read the credential 128 or similar cards that operate with a similar protocol or utilize a similar data format. The reader 244 may also be configured to read cards or credentials of other types (e.g., the mobile device 124). For instance, the reader 244 may be configured to wirelessly or by contact read a mobile device 124 and/or credential 128.

The format or form factor of a credential 128 should not be limited to any particular type of format or form factor. Examples of suitable form factors that may be used for a credential 128 include, without limitation, magstripe cards, chip-based cards, contactless/wireless cards, key fobs, mobile communication devices (e.g., mobile device 124), optically-readable cards, or the like. It should be appreciated that one or both of the mobile device 124 and credential 128 may be capable of being read by a reader 244 when brought within a predetermined distance of the reader 244 (e.g., if the reader 244 includes an antenna and is utilize a contactless communication protocol like Near Field Communications (NFC) or Bluetooth). Alternatively or additionally, a credential 128 may be capable of being read by a reader 244 when inserted to a slot of a card reader 244 or swiped through a card reader 244. To the extent that the form factor of a credential 128 can vary and is not limited, it should be appreciated that the reader 244 may be provided with any number of hardware and/or software components to enable interactions with a credential 128. More specifically, each a reader 244 may include one or multiple readers, each of which may be provided with appropriate hardware and/or software components to enable the reader 244 to extract/read data that is stored on a credential 128. As an example, a reader 244 may be configured to read or extract a player ID, a tag ID, player information, automated transfer preferences, or the like from a credential 128 or from a mobile device 124.

In some embodiments, when the reader 244 is used to read data from a credential 128, the data read from the credential 128 may be provided directly to the communication interface 240. The communication interface 240 may be configured to provide some or all of the data from the credential 128 directly to the game management system 116 (e.g., without providing the data first to the processor 236). The communication interface 240 may then provide some or all of the data from the credential 128 to the processor 236 or may inform the processor 236 of a card read event. In some embodiments, the communication interface 240 may not necessarily provide any data from the credential 128 to the game management system 116. Rather, upon reading data from the credential 128, the communication interface 240 may automatically initiate a login process for the player 112 that presented the credential 128 to the reader 244.

FIG. 4 illustrates another example of a gaming device. Specifically, FIG. 4 illustrates a mobile device 124, which is shown to include user interface device(s) 252 in the form of a touch-sensitive display 404 and one or more buttons 408. As discussed above, any components depicted and described as being included in a gaming machine 108 may be included in a mobile device 124. In this way, a player 112 may be allowed to engage in a gaming session using a mobile device 124 and the mobile device 124 may execute the game instructions 208 to implement the gaming session, to execute automated transfer events, and the like. Alternatively or additionally, a player 112 may pair their mobile device 124 with a gaming machine 108 to complete a login process. The pairing of a mobile device 124 with a gaming machine 108 may also correspond to a condition/requirement for an automated transfer event to occur at either the gaming machine 108 or at the mobile device 124. As a more specific, but non-limiting example, the mobile device 124 may include a mobile wallet or application that contains an account to be used in connection with an automated transfer event. If the mobile device 124 is not paired with the gaming machine 108 implementing the gaming session, then the gaming machine 108 may not be allowed to implement an automated transfer event unless the mobile device 124 is paired thereto, thereby creating a link between the credit meter 232 and a suitable account.

GUI Elements

Figure 5A:
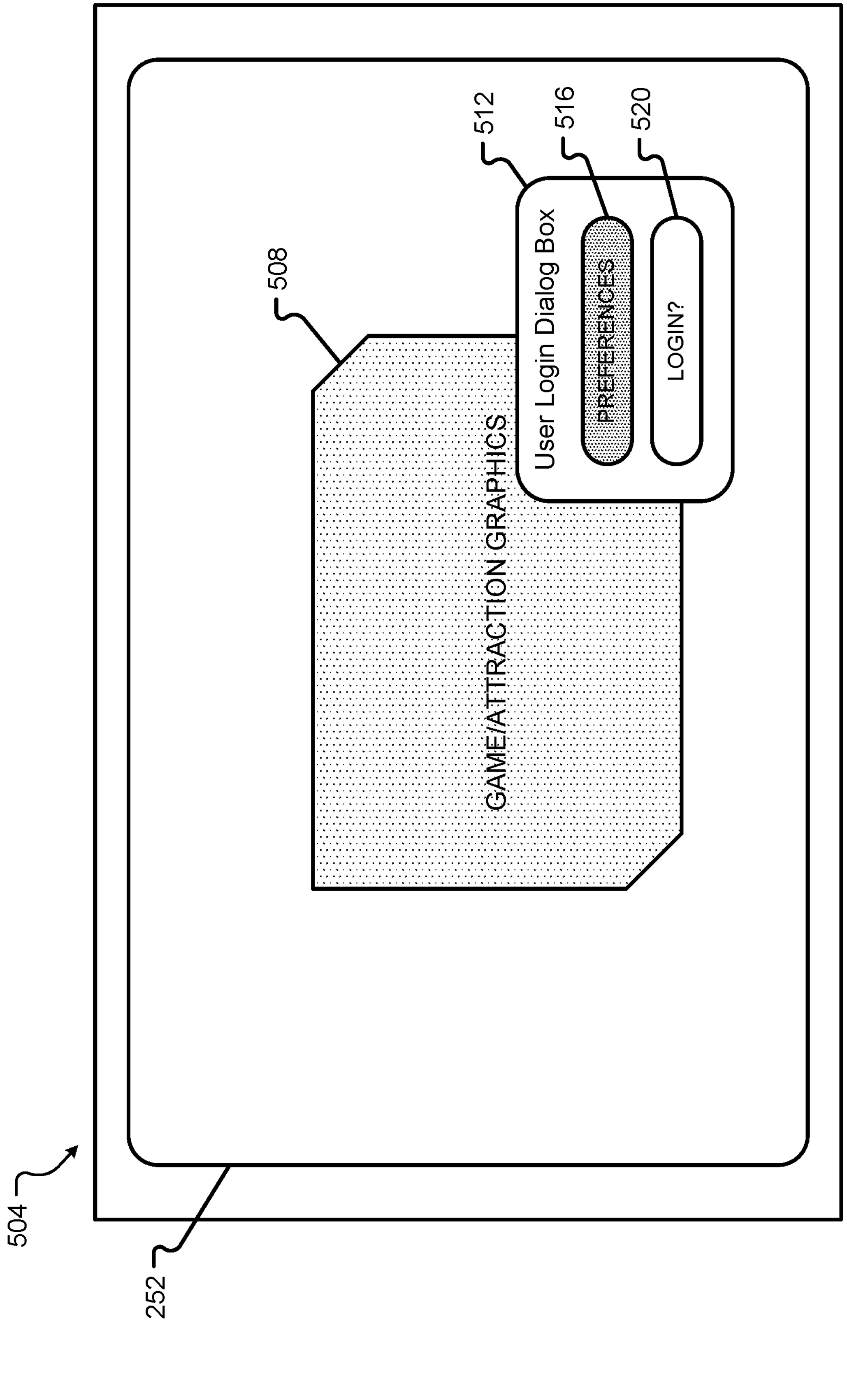
FIG. 5A illustrates a user login dialog box presented as a Graphical User Interface (GUI) element in accordance with embodiments of the present disclosure.

With reference now to FIGS. 5A-5F, various operations of the game instructions 220, the UI instructions 216, and/or the automated transfer rules 224 will be described in accordance with at least some embodiments of the present disclosure. Referring initially to FIG. 5A, a display 504 is shown to include a user interface device 252. The display 504 may present one or more GUI elements to the player 112 for purposes of enabling a gaming session. As described herein, a gaming session may correspond to an extended period of time where a player 112 interacts with a gaming device (e.g., a gaming machine 108, a mobile device 124, combinations thereof, or the like) and the gaming device executes game instructions 208 to facilitate the player 112 interactions.

In some embodiments, the display 504 may present the player 112 with a number of GUI elements, which may include game/attraction graphics 508. The player 112 may also be presented with a login dialog box 512, which provides a mechanism for the player 112 to complete a player login process with the game management system 116. In some embodiments, the login dialog box 512 may include a preferences GUI element 516 and a login GUI element 520. The preferences GUI element 516, if activated or selected by the player 112, may allow the player 112 to define one or more preferences for the gaming session (e.g., for the gaming device to implement during the gaming session or as long as the player 112 is logged into the gaming device). Activation or selection of the login GUI element 520 may cause the gaming device to execute game login instructions 220.

Figure 5B:
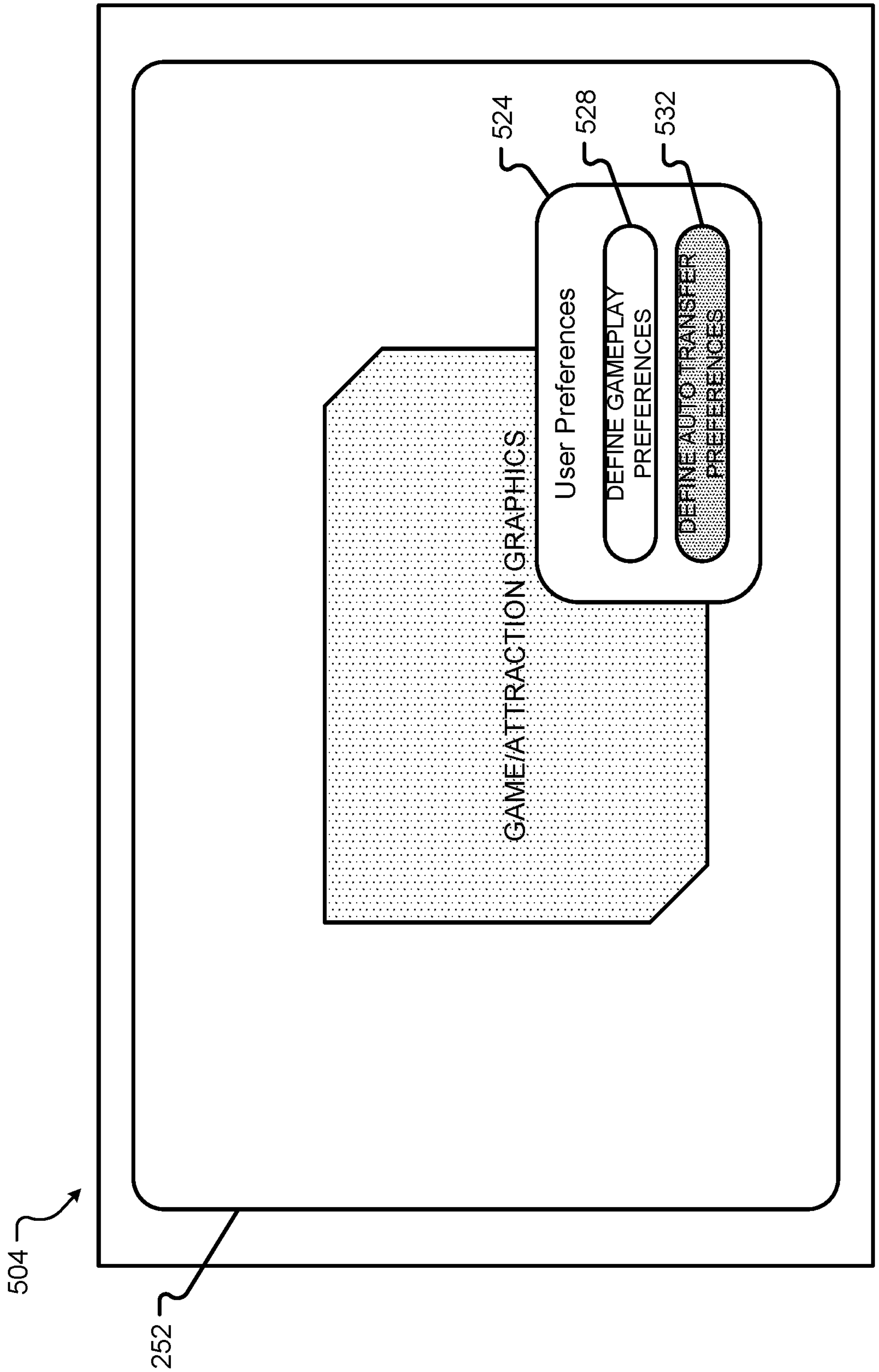
FIG. 5B illustrates a user preferences dialog box presented as a GUI element in accordance with embodiments of the present disclosure.

FIG. 5A illustrates an example where the player 112 activates or selects the preferences GUI element 516, which may cause the UI instructions 216 to transition the display 504 to a second configuration where a user preferences dialog box 524 is presented to the player 112 as shown in FIG. 5B. In some embodiments, the player 112 may be provided with further options to define one or more player preferences to employ during a gaming session. As an example, the user preferences dialog box 524 may present a gameplay preferences GUI element 528 and an auto transfer preferences GUI element 532. One or both GUI elements 528, 532 may be selected or activated prior to the player 112 completing the login process and/or prior to the player 112 initiating a gaming session. If the player 112 activates or selects the gameplay preferences GUI element 528, then the gaming device may execute the user enrollment instructions 212 and/or game login instructions 220 that allow the player 112 to define one or more preferences for use by the game instructions 208 during a gaming session.

If the player 112 activates or selects the auto transfer preferences GUI element 532, then the gaming device may allow the player 112 to define one or more automated transfer preferences stored in the automated transfer preferences field 140 and/or select one or more automated transfer rules 224 to be used in connection with an automated transfer event (e.g., where the preference(s) may provide a definition of conditions for triggering an automated transfer event, timing associated with an automated transfer event, accounts to use for an automated transfer event, types of automated transfer events, etc.). In some examples, activation or selection of the auto transfer preferences GUI element 532 may cause the UI instructions 216 to transition the display 504 to a third configuration where an auto transfer preferences dialog box 536 is presented to the player 112 as shown in FIG. 5C.

Figure 5C:
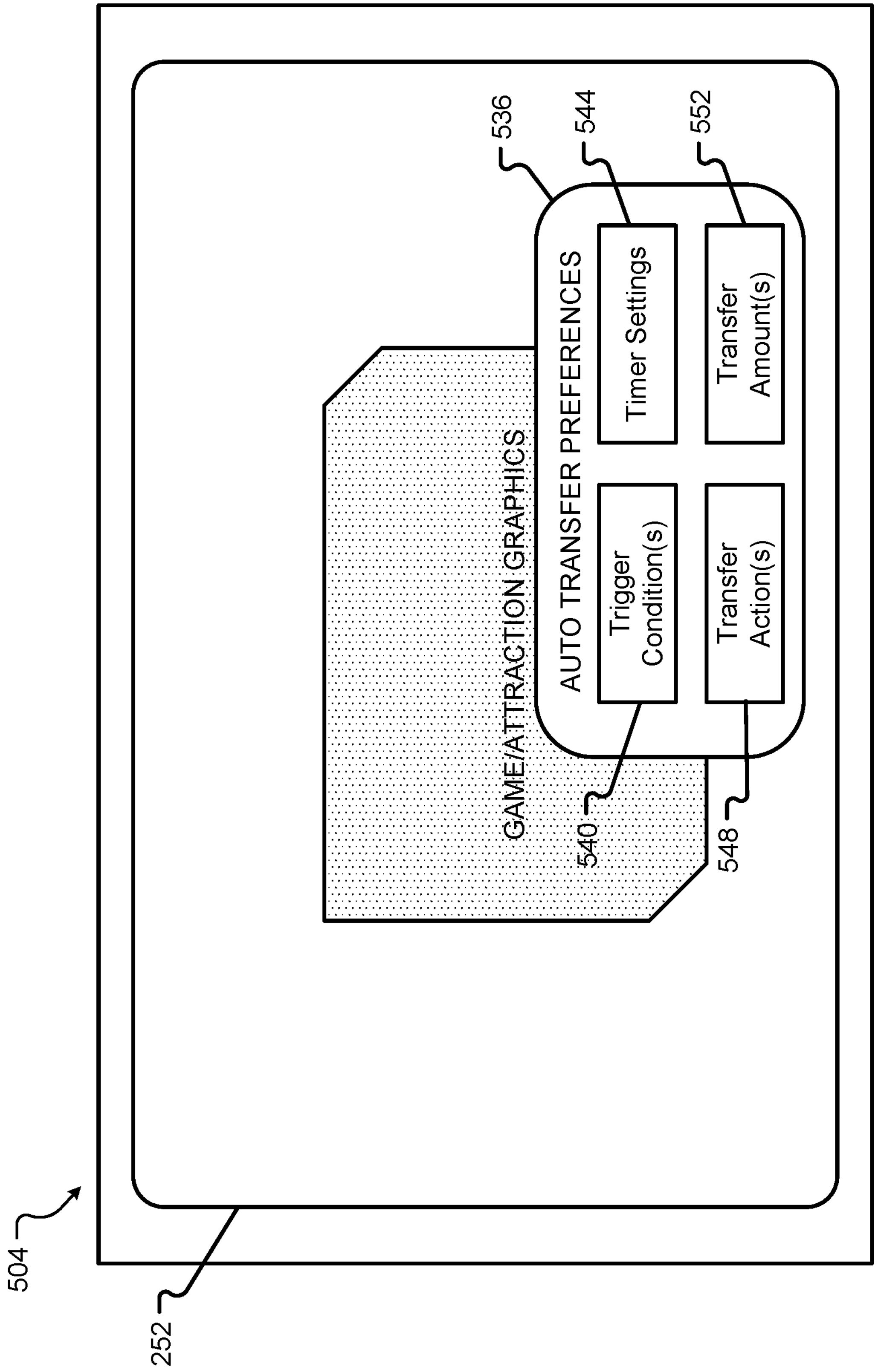
FIG. 5C illustrates an auto transfer preferences dialog box presented as a GUI element in accordance with embodiments of the present disclosure.

Referring now to FIG. 5C, the auto transfer preferences dialog box 536 is shown to include a number of GUI elements that, when selected or activated by the player 112, may allow the player 112 to define various parameters or rules to be used in connection with an automated transfer event. Illustratively but without limitation, the auto transfer preferences dialog box 536 may present the player 112 with a trigger condition(s) GUI element 540, a timer settings GUI element 544, a transfer actions GUI element 548, and a transfer amount(s) GUI element 552. As the names suggest, the trigger condition(s) GUI element 540, when selected by the player 112, may allow the player to predefine one or more conditions that, when encountered during a gaming session, cause the game instructions 508 to trigger an automated transfer event. It should be appreciated that the trigger condition(s) associated with triggering an automated credit transfer-in event may be the same as or different from the trigger condition(s) associated with triggering an automated credit transfer-out event. Non-limiting examples of trigger conditions may include the credit meter 232 falling below a predetermined value or predetermined threshold, the credit meter 232 exceeding a predetermined value or predetermined threshold, a game event occurring, a series of symbols landing on a payline, a bonus spin being awarded, a bonus game being implemented, a predetermined amount of time passing since a previous automated transfer event, etc.

The timer settings GUI element 544, when selected or activated by the player 112, may allow the player 112 to predefine a timer value that is used to track how long to wait after a trigger condition before implementing an automated transfer event. It should be appreciated that the timer settings associated with invoking an automated credit transfer-in event may be the same as or different from the timer settings associated with invoking an automated credit transfer-out event. For instance, a player 112 may be allowed to define a longer period of time between a trigger condition and invoking an automated credit transfer-in event as compared a period of time between a trigger condition and invoking an automated credit transfer-out event.

The transfer action(s) GUI element 548, when selected or activated by the player 112, may allow the player 112 to define whether certain preferences are being defined by a certain type of transfer event. For instance, the player 112 may be allowed to define whether an automated transfer event will correspond to an automated credit transfer-in event and/or an automated credit transfer-out event. Alternatively or additionally, the player 112 may be allowed to use the transfer action(s) GUI element 548 to define actions that the player 112 can take to cancel or override an automated transfer event (e.g., what button to push to cancel an automated transfer event, what button to push to reset a timer associated with an automated transfer event, etc.).

The transfer amount(s) GUI element 552, when selected or activated by the player 112, may allow the player 112 to define amounts of credits to be transferred into or out of the credit meter 232 when implementing an automated transfer event. The transfer amount(s) GUI element 552 may also allow the player 112 to define which account(s) a particular automated transfer event should use (e.g., which account to transfer credits into and/or extract credits from).

Figure 5D:
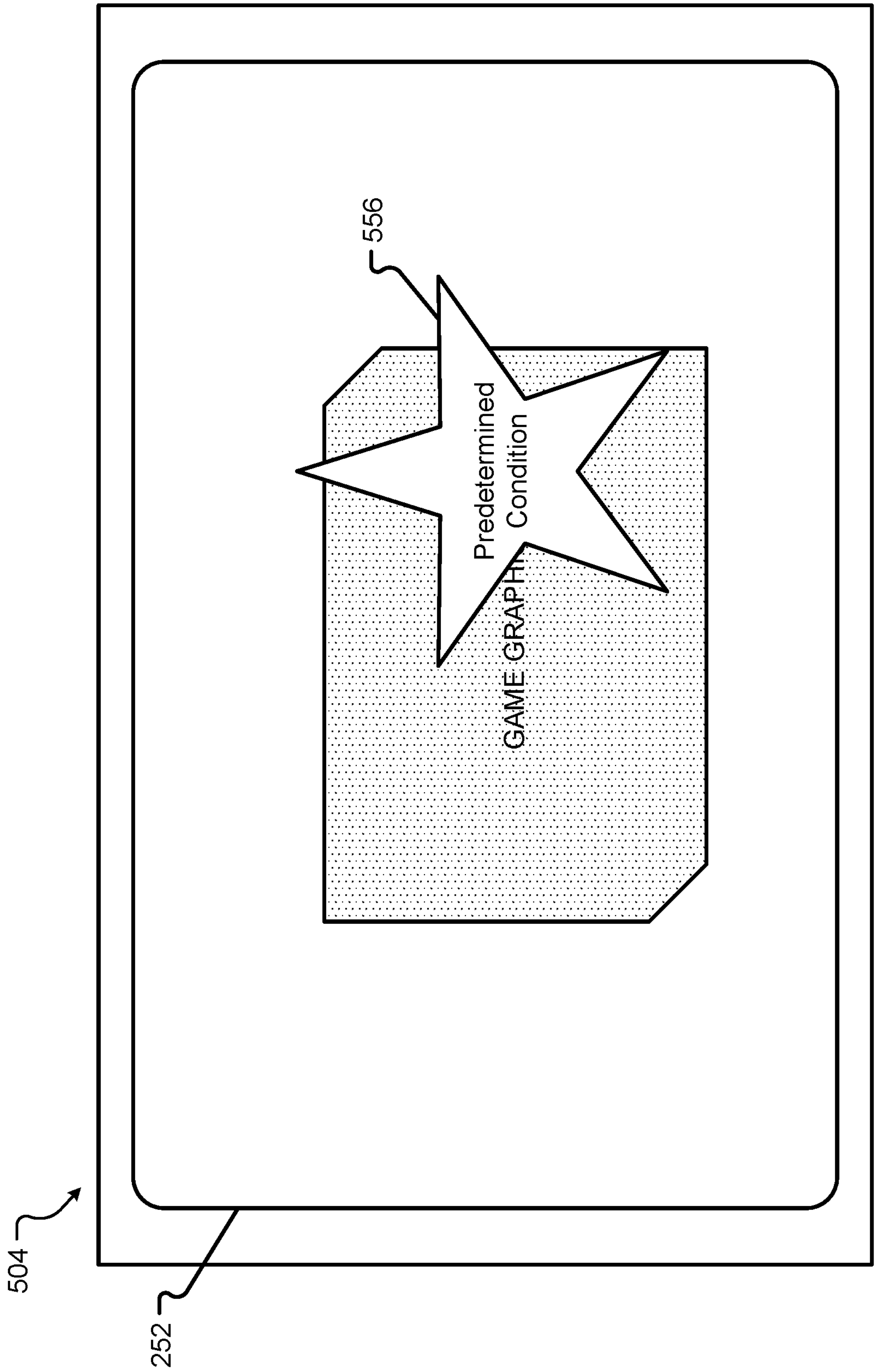
FIG. 5D illustrates a predetermined condition occurring during a gaming session in accordance with embodiments of the present disclosure.

Referring now to FIG. 5D, another configuration of the display 504 is depicted in accordance with at least some embodiments of the present disclosure. At this point in time, the player 112 may have already defined one or more automated transfer preferences stored in the automated transfer preferences field 140 and the gaming device may have generated one or more appropriate automated transfer rules 224 to respect the preferences. The preferences may have been defined by the player 112 prior to engaging in a gaming session, although it may be possible to allow the player 112 to change, redefine, or initially define automated transfer preferences during a gaming session. FIG. 5D specifically illustrates an occurrence of a predetermined condition 556, which may or may not result in the display 504 presenting a particular GUI element to the player 112. For instance, the predetermined condition 556 may correspond to an event occurring in the background of a gaming session that is not presented to the player 112. Alternatively, a predetermined condition 556 may correspond to a game outcome or an occurrence of an event during a gaming session that is visually presented to the player 112 via the display 504. It should be appreciated that the predetermined condition 556 may correspond to a single condition or a plurality of conditions occurring simultaneously or within a predetermined amount of time of one another.

Figure 5E:
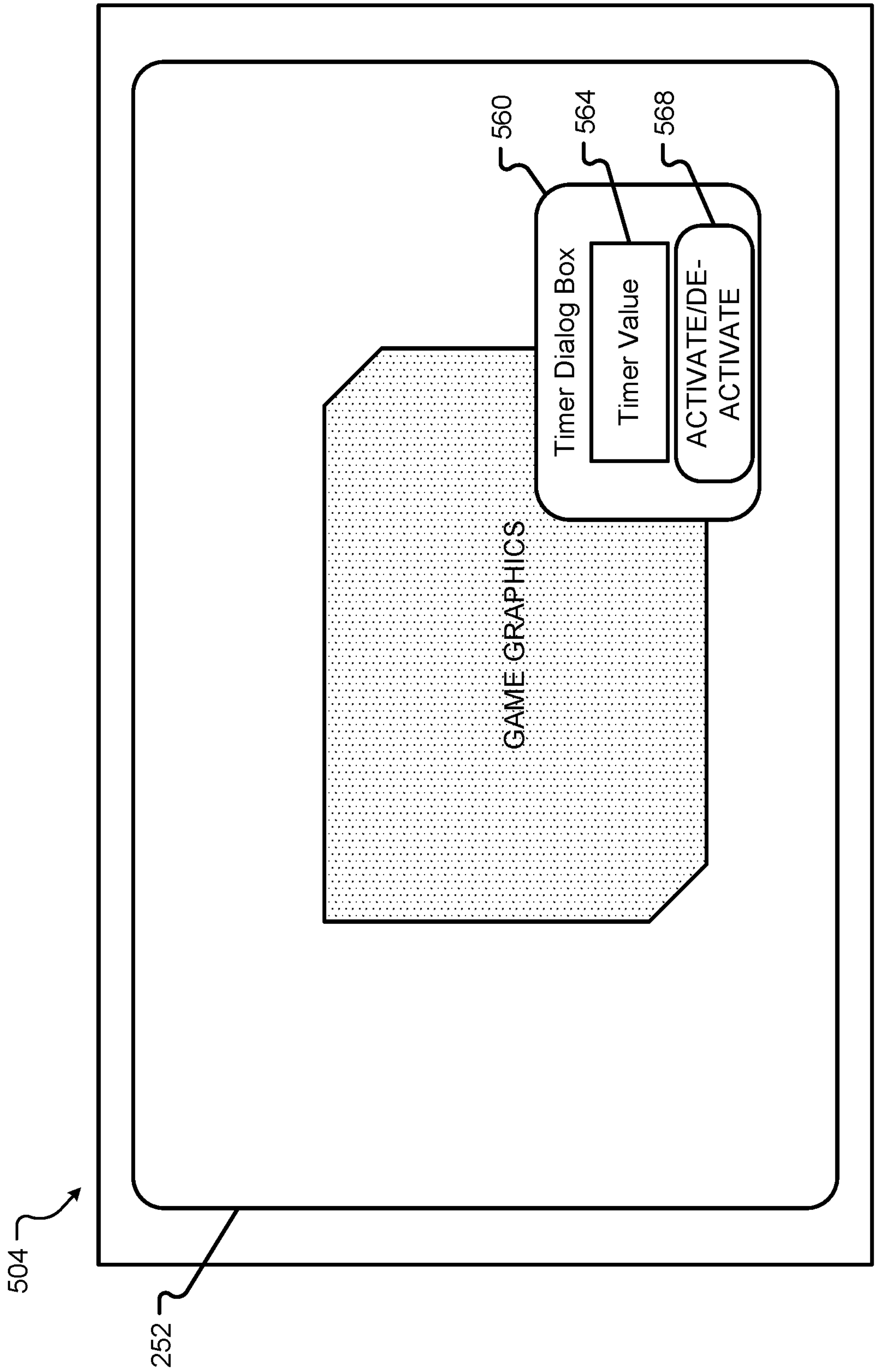
FIG. 5E illustrates a timer displayed as a GUI element in accordance with embodiments of the present disclosure.

As shown in FIG. 5E, when the predetermined condition 556 may cause the display 504 to present a timer dialog box 560 to the player 112. The timer dialog box 560 may present the player 112 with a timer value 564 and an activate/deactivate GUI element 568. The timer value 564 may present the player 112 with an amount of time until an automated transfer event will occur. In some embodiments, the timer value 564 may count down (e.g., decrement) from a predetermined time to zero. Once the timer value 564 reaches zero, the automated transfer event may be implemented without requiring any specific input from the player 112. For instance, in the absence of receiving input from the player 112 or in the absence of the player 112 selecting the activate/de-activate GUI element 568, the gaming device may still implement an automated transfer event.

The activate/de-activate GUI element 568, when selected by the player 112, may cause an automated transfer event to occur or be cancelled prior to the timer value 564 counting all the way down to zero. For instance, if selected as an activate feature, the activate/de-activate GUI element 568 may cause the gaming device to implement an automated transfer event prior to a predefined amount of time expiring since the predetermined condition 556. As another example, if selected as a de-activate feature, the activate/de-activate GUI element 568 may cause the gaming device to cancel or delay an automated transfer event. De-activation may, however, require the player 112 to select the activate/de-activate GUI element 568 prior to timer expiration. The activate/de-activate GUI element 568 may be used to receive a cancel input and/or transfer input from the player 112.

Figure 5F:
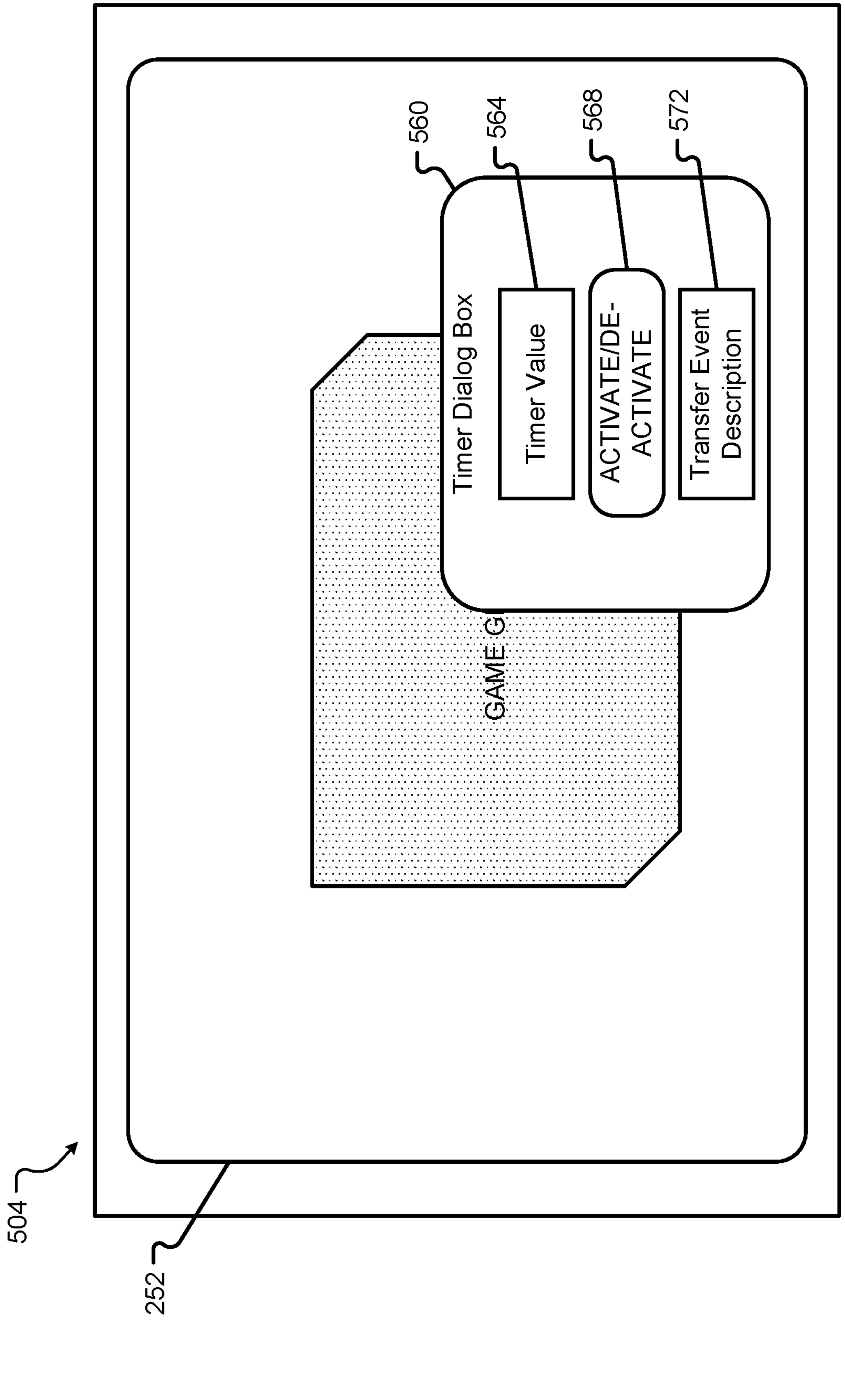
FIG. 5F illustrates a timer dialog box including a transfer event description as a GUI element in accordance with embodiments of the present disclosure.

FIG. 5F illustrates another example of a timer dialog box 560 where a transfer event description 572 is provided to the player 112. In this example, the player 112 may be presented with information describing the automated transfer event that will occur if the player 112 allows the timer value 564 to reach zero (e.g., allows the predetermined amount of time to elapse since the predetermined condition 556 occurred). The transfer event description 572 may include an indication of the type of automated transfer event (e.g., whether a credit-in or credit-out event), an identification of the account to be used for the automated transfer event, a pairing status of the player's 112 mobile device 124 (e.g., whether the player's 112 mobile device 124 is currently paired or not paired with a gaming machine 108), etc.

Methods

With reference now to FIG. 6-9, various methods will be described in accordance with at least some embodiments of the present disclosure. While the methods are shown as having steps performed in a certain order, it should be appreciated that certain steps may be performed in any order, concurrently, or otherwise. Additionally, the various methods and steps depicted and described herein may be performed at any one or any combination of system 100 components. For instance, the methods may be performed partially or entirely within any one of a gaming machine 108, mobile device 124, game management system 116, gaming device, or combinations thereof.

Figure 6:
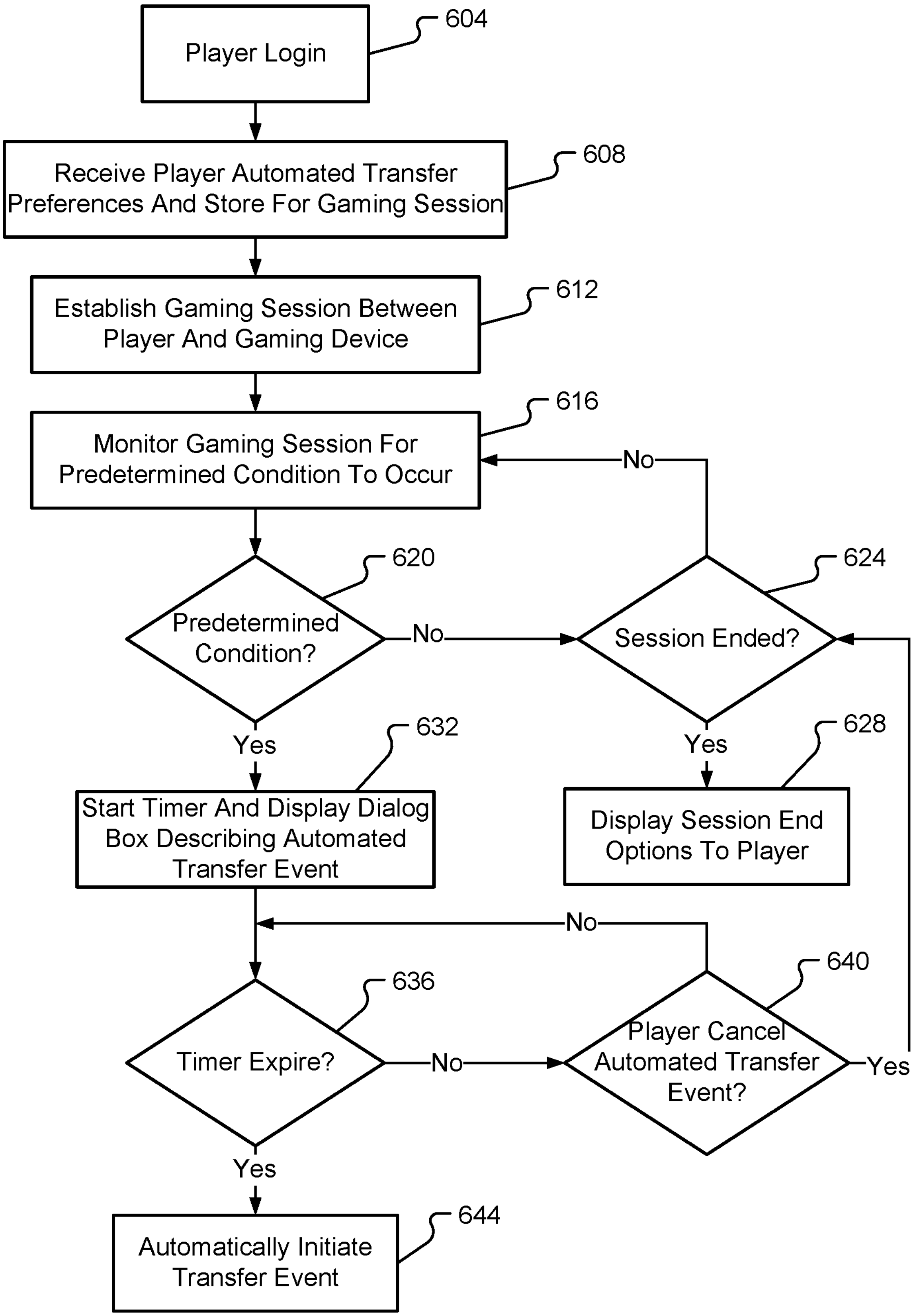
FIG. 6 is a flow diagram illustrating a method of implementing an automated transfer event in accordance with embodiments of the present disclosure.

With reference now to FIG. 6, a flow diagram illustrating a method of implementing an automated transfer event will be described in accordance with embodiments of the present disclosure. The method begins when a player 112 completes a login process with a gaming device (step 604). As part of logging in, the player 112 may present a mobile device 124 and/or credential 128 to a gaming machine 108 or may provide one or more player credentials (e.g., player ID, username, password, redemption code, etc.) to a gaming device that is implementing game instructions 208.

The method may continue with the gaming device receiving automated transfer preferences field 140 for a player 112 (step 608). The automated transfer preferences field 140 may be received from the game management system 116 in response to a request specifically sent for such preferences by the gaming device and/or in response to the gaming management system 116 automatically transmitting the automated transfer preferences stored in the automated transfer preferences field 140 in response to the login process. The automated transfer preferences stored in the automated transfer preferences field 140, once received, may be stored by the gaming device and/or converted into automated transfer rules 224 for use during a gaming session. For instance, the gaming device may allow the game instructions 208 to reference and use the automated transfer rules 224 during the gaming session.

The method may continue by establishing a gaming session between the player 112 and the gaming device (step 612). This step may involve allowing the player 112 to select a game to play, allowing a player 112 to select an amount to wager during a first gameplay instance, and/or invoking the game instructions 208 to provide the game to the player 112. Establishment of the gaming session may require the player 112 to provide a certain number of credits to the credit meter 232 (e.g., by inserting coins, inserting cash, inserting a credential 128, carding-in, pairing a mobile device 124 to the gaming device, etc.).

As the gaming session proceeds, the method may continue with the game instructions 208 monitoring the gaming session for a predetermined condition 556 to occur (step 616). The predetermined condition 556 may correspond to an in-game event, a series of events, a combination of events, or the like. At step 620 it is determined if a predetermined condition 556 has occurred. This determination may be made with reference to the automated transfer rules 224. If the predetermined condition 556 has not occurred, then the method continues by determining if the gaming session has ended (step 624). This query may be answered positively if the player 112 has left a predetermined proximity of the gaming device, as an example. Alternatively or additionally, this query may be answered positively if the player 112 has carded-out, cashed-out, asked for a ticket to be printed, logged out, or provided some other indication to the gaming device that the player 112 will discontinue interacting with the game instructions 208.

If the query of step 624 is answered negatively, then the method returns to step 616. If the query of step 624 is answered positively, then the game instructions 208 may discontinue operation and the player 112 may be presented with an indication that the gaming session has ended (step 628). As part of ending the gaming session, the player 112 may be provided with options for ending the session, including whether the player 112 desires to receive remaining credits from the credit meter 232 back into a linked account, printed as a voucher/ticket, provided as coins or chips, provided as cash, or the like.

Referring back to step 620, if the predetermined condition 556 is detected, then the method continues by starting a timer and notifying the player 112 that the timer has started in connection with possibly initiating an automated transfer event (step 632). In some embodiments, the timer value 564 may be displayed to the player 112 along with other automated transfer information. For instance, the player 112 may be provided with a transfer event description 572 as well as an activate/de-activate GUI element 568.

Once presented with the timer information (e.g., via a timer dialog box 560), the player 112 may be allowed to continue the gaming session without necessarily needed to interact with the timer dialog box 560. Instead, the player 112 can continue the gaming session and allow the automated transfer event to occur after the timer expires (step 636). If the timer has not yet expired, but the player indicates a desire to cancel the automated transfer event (step 640), then the method may proceed to step 624. If the timer has yet to expire and the player does not cancel the automated transfer event (e.g., by allowing the timer to continue counting down), the method may return to step 636.

If the timer expires before the player 112 cancels the automated transfer event and while the gaming session continues, the method may proceed with the gaming device automatically initiating the automated transfer event (step 644). The automated transfer event may be executed in accordance with the automated transfer rules 224 maintained at the gaming device. Illustratively, the automated transfer event may cause a player-defined amount of credit to be transferred into or out of the credit meter 232 (e.g., from or to a linked account).

Figure 7:
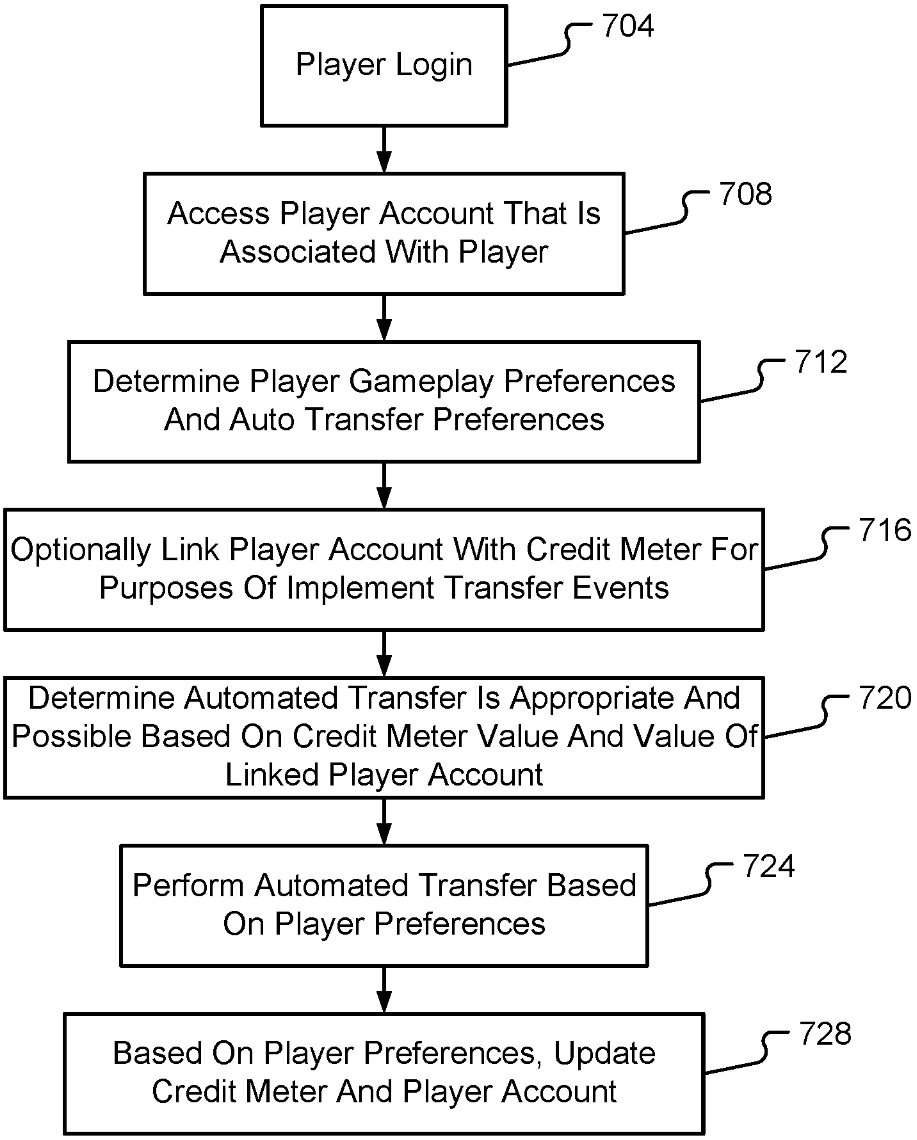
FIG. 7 is a flow diagram illustrating a method of obtaining player preferences and implementing an automated transfer event based on the player preferences in accordance with embodiments of the present disclosure.

Referring now to FIG. 7, a flow diagram illustrating a method of obtaining player preferences and implementing an automated transfer event based on the player preferences will be described in accordance with embodiments of the present disclosure. The method begins with a player login process (step 704). This step may be similar or identical to step 604. Thereafter, the gaming device may access a player account that is associated with the player 112 logging into the gaming device (step 708). Illustratively, the gaming device may request the game management system 116 to transmit player information that is associated with the player 112 logging into the gaming device.

Upon receiving the player information from the player's 112 account, the gaming device may determine gameplay preferences as well as automated transfer preferences stored in the automated transfer preferences field 140 for the player 112 (step 712). The gaming device may also, optionally, link an account identified by the player 112 (e.g., as determined during the login process or based on the automated transfer preferences stored in the automated transfer preferences field 140) with the credit meter 232 for purposes of funding a gaming session and/or for purposes of implementing automated transfer events during a gaming session (step 716).

The method may then continue by determining that an automated transfer event is appropriate (e.g., based on an occurrence of a predetermined condition 556) and possible based on a value of credits in the credit meter 232 and an available value of funds in the linked account (step 720). If either the credit meter 232 or the linked player account do not have sufficient credit/funds to complete the automated transfer event, then the automated transfer event may be discontinued. However, if there are sufficient credits/funds in the credit meter 232 and/or linked account, then the method continues with the gaming device performing the automated transfer event based on the player's 112 automated transfer preferences stored in the automated transfer preferences field 140 (step 724). As discussed in connection with FIG. 6, implementing the automated transfer event may include updating a credit meter 232 and/or the linked player account with appropriate credits/funds to complete the automated transfer event. It should be appreciated that the automated transfer event may include transferring credit from the credit meter 232 to the linked account or transferring credit from the linked account to the credit meter 232 (step 728). The directly of credit flow may depend upon the type of automated transfer event and/or the player's 112 automated transfer preferences stored in the automated transfer preferences field 140.

Figure 8:
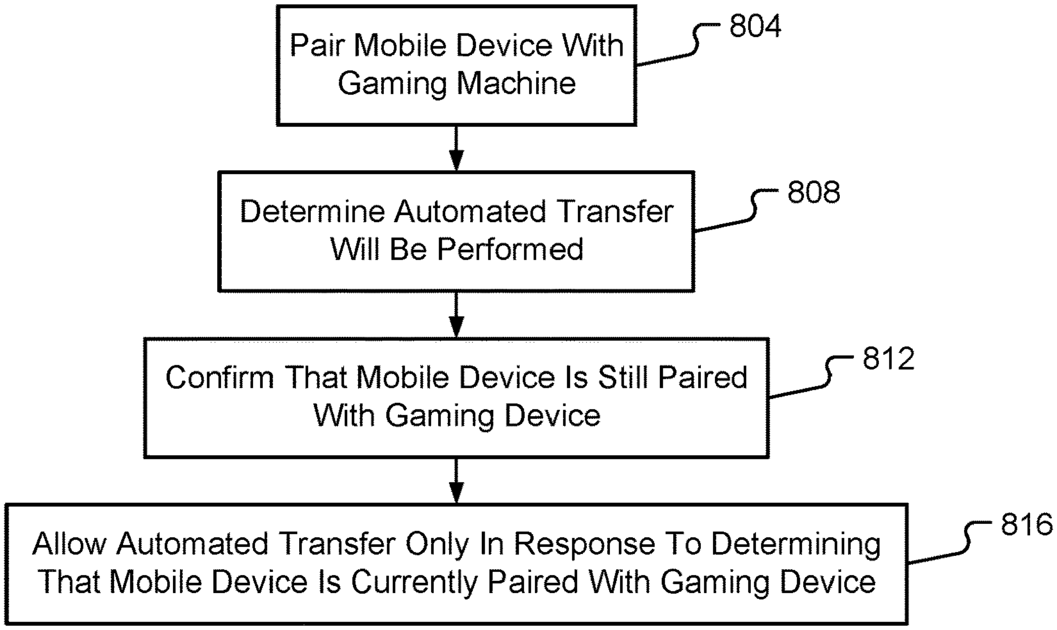
FIG. 8 is a flow diagram illustrating a method of controlling an automated transfer event in accordance with embodiments of the present disclosure.

Referring now to FIG. 8, a flow diagram illustrating a method of controlling an automated transfer event will be described in accordance with embodiments of the present disclosure. The method begins by pairing a mobile device 124 with a gaming machine 108 or other type of gaming device (step 804). Pairing the mobile device 124 with the gaming machine 108 may include pairing the two devices using a wireless communication protocol (e.g., Bluetooth, BLE, NFC, WiFi, etc.).

The method may continue by determining that an automated transfer event will be performed (step 808). In some embodiments, the automated transfer event may be initiated as described in connection with FIGS. 6 and/or 7. As an example, the automated transfer event may be initiated in response to detecting a predetermined condition 556 and a timer expiring a predetermined amount of time after detecting the predetermined condition 556.

Before completing the automated transfer, the method may include confirming that the mobile device 124 is still paired with the gaming machine 108 or gaming device (step 812). If it is confirmed that the devices are still paired, then the method may continue by allowing the automated transfer event to occur (step 816). In some embodiments, however, the automated transfer event may only be allowed to occur in response to determining that the mobile device 124 is currently paired with the gaming device. Failing the detect the current pairing may result in the automated transfer event being cancelled, paused, or discontinued.

Figure 9:
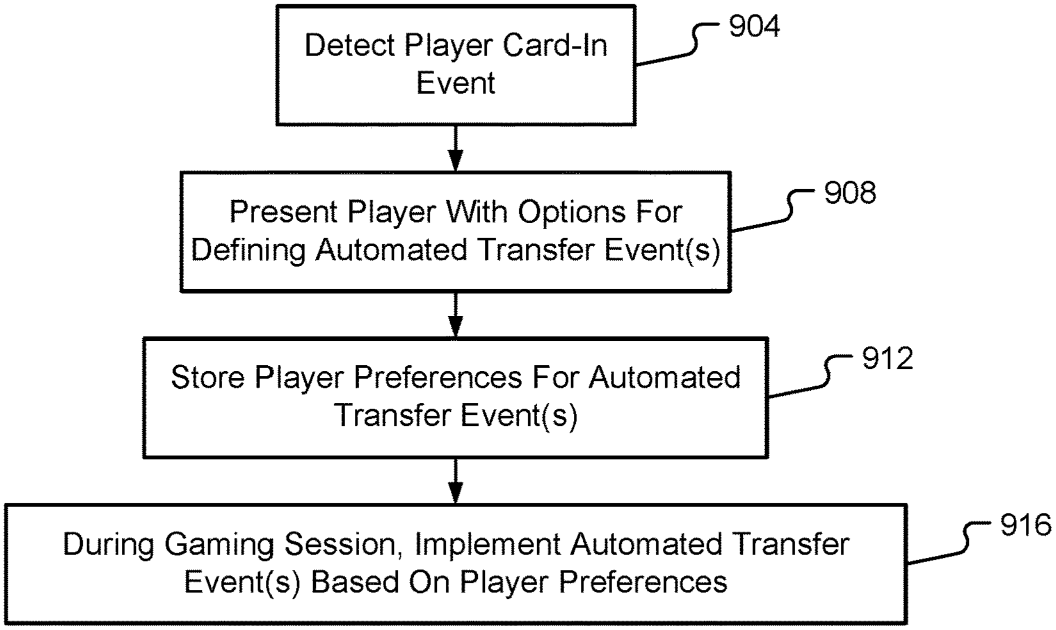
FIG. 9 is a flow diagram illustrating a method of obtaining player preferences during a card-in event in accordance with embodiments of the present disclosure.

Referring now to FIG. 9, a flow diagram illustrating a method of obtaining player preferences during a card-in event will be described in accordance with embodiments of the present disclosure. The method begins by detecting a card-in event at a gaming device (step 904). The card-in event may correspond to a player 112 inserting a player loyalty card (e.g., a credential 128) into the gaming device, pairing a mobile device 124 with a gaming device, presenting a credential 128 to the gaming device, or the like.

Upon detecting the card-in event, the method may continue by presenting the player 112 with options for defining an automated transfer event or automated transfer preferences stored in the automated transfer preferences field 140 (step 908). The player 112 may be allowed to enter the preferences directly to the gaming device or define a location (e.g., a game management system 116) where the preferences can be retrieved.

The method continues when the player's 112 automated transfer preferences stored in the automated transfer preferences field 140 are received and stored at the gaming device (step 912). The automated transfer preferences stored in the automated transfer preferences field 140 may be stored as preferences in memory 204 or may be stored as automated transfer rules 224. The method may then continue by implementing one or more automated transfer events during a gaming session based on the automated transfer preferences stored in the automated transfer preferences field 140 (step 916). The automated transfer events may include transfer-in events, transfer-out event, or combinations thereof. As a non-limiting example, the implementation of a transfer-out event may cause the gaming device to utilize a printer to print a ticket that includes a redemption value equal to the current value stored in the credit meter 232. In some embodiments, the gaming device may print a ticket that includes a redemption value equal to a player-defined value, which may be less than the amount of credit in the credit meter 232. In such a situation, the gaming device may print the ticket for the player-defined value and leave the remaining credit in the credit meter 232 for continuing the gaming session.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled “Internet Remote Game Server,” and U.S. Pat. No. 8,147,334, entitled “Universal Game Server.”

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a “circuit,” “module,” “component,” or “system.” Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming device, comprising:

a processor;

a user interface coupled with the processor; and a memory coupled with the processor and storing therein instructions that, when executed by the processor, cause the processor to:

determine, at a first time, that a predetermined condition has been met during a gaming session established between a player and the gaming device;

in response to determining that the predetermined condition has been met during the gaming session, automatically display a prompt to the player via the user interface, wherein the prompt provides an indication that an automated transfer event will occur a predetermined amount of time after the first time with respect to a credit meter being used to conduct the gaming session at the gaming device, wherein the credit meter comprises a device that stores information related to automated transfer events;

initiate a timer device to track an elapsed time relative to the first time;

determine, with the timer device, that the elapsed time equals the predetermined amount of time;

in response to determining that the elapsed time equals the predetermined amount of time, trigger the automated transfer event to automatically occur; and update the credit meter to indicate an account to which credits were transferred during the automated transfer event, an amount of credits transferred during the automated transfer event, and that the automated transfer event occurred automatically as compared to being a manual transfer event.

2. The gaming device of claim 1, wherein the predetermined condition comprises determining that a game outcome has occurred during the gaming session, wherein the predetermined condition further comprises determining that the game outcome has caused a value stored in the credit meter to fall below a predetermined threshold, and wherein the automated transfer event comprises increasing the value stored in the credit meter by a player-defined value.

3. The gaming device of claim 2, wherein the automated transfer event further comprises decrementing a player account by an amount equal to the player-defined value after the value stored in the credit meter is increased by the player-defined value.

4. The gaming device of claim 3, wherein the predetermined threshold, the predetermined amount of time, and the player-defined value are defined by the player prior to the first time.

5. The gaming device of claim 1, wherein the predetermined condition comprises determining that a player-defined amount of time has elapsed since the first time and wherein the automated transfer event comprises decrementing the credit meter a current value to a value of zero.

6. The gaming device of claim 5, wherein the instructions further cause a printer of the gaming device to print a ticket that includes a redemption value equal to the current value.

7. The gaming device of claim 1, wherein the instructions further cause the processor to:
determine that the player has logged into the gaming device as part of initiating the gaming session;
access a player account that is associated with the player; and
link the player account with the credit meter for purposes of implementing the automated transfer event.

8. The gaming device of claim 1, wherein the instructions further cause the processor to:
accept a cancel input from the player prior to the elapsed time equaling the predetermined amount of time; and
cancel the automated transfer event in response to accepting the cancel input from the player prior to the elapsed time equaling the predetermined amount of time.

9. The gaming device of claim 1, wherein the instructions further cause the processor to:
accept a transfer input from the player prior to the elapsed time equaling the predetermined amount of time; and
initiate the automated transfer event in response to accepting the transfer input from the player prior to the elapsed time equaling the predetermined amount of time.

10. The gaming device of claim 1, wherein the timer device is displayed to the player along with the prompt.

11. The gaming device of claim 1, wherein the instructions further cause the processor to:
determine that a mobile device associated with the player is currently paired with the gaming device; and
allow the automated transfer event to continue only in response to determining that the mobile device is currently paired with the gaming device.

12. The gaming device of claim 1, wherein the instructions further cause the processor to:
detect a player card-in event at the gaming device; and
in response to detecting the player card-in event, present the player with options for defining the predetermined amount of time and the automated transfer event.

13. A method, comprising:
establishing a gaming session between a player and a gaming device;
determining, with a processor, that a predetermined condition has been met during the gaming session;
in response to determining that the predetermined condition has been met during the gaming session, automatically displaying a prompt to the player via a user interface of the gaming device, wherein the prompt provides an indication that an automated transfer event will occur a predetermined amount of time after displaying the prompt with respect to a credit meter being used to conduct the gaming session at the gaming device, wherein the credit meter comprises a device that stores information related to automated transfer events;
determining, with the processor, that the predetermined amount of time has passed since displaying the prompt;
in response to determining that the predetermined amount of time has passed since displaying the prompt, automatically initiating the automated transfer event; and
updating the credit meter to indicate an account to which credits were transferred during the automated transfer event, an amount of credits transferred during the automated transfer event, and that the automated transfer event occurred automatically as compared to being a manual transfer event.

14. The method of claim 13, wherein the predetermined condition comprises determining that a game outcome has occurred during the gaming session, wherein the predetermined condition further comprises determining that the game outcome has caused a value stored in the credit meter to fall below a predetermined threshold, and wherein the automated transfer event comprises increasing the value stored in the credit meter by a player-defined value.

15. The method of claim 14, wherein the automated transfer event further comprises decrementing a player account by an amount equal to the player-defined value after the value stored in the credit meter is increased by the player-defined value.

16. The method of claim 15, wherein the predetermined threshold, the predetermined amount of time, and the player-defined value are defined by the player prior to determining that the predetermined condition has been met during the gaming session.

17. The method of claim 13, wherein the predetermined condition comprises determining that a player-defined amount of time has elapsed since displaying the prompt and wherein the automated transfer event comprises decrementing the credit meter a current value to a value of zero.

18. The method of claim 13, further comprising:
determining, with the processor, that the player has logged into the gaming device as part of initiating the gaming session;
accessing, with the processor, a player account that is associated with the player; and
linking the player account with the credit meter for purposes of implementing the automated transfer event.

19. A system, comprising:
a processor; and
a memory, coupled with the processor, comprising instructions that are executable by the processor, wherein the instructions comprise instructions that:
determine, at a first time, that a predetermined condition has been met during a gaming session established between a player and a gaming device;
automatically display a prompt to the player via a user interface in response to determining that the predetermined condition has been met during the gaming session, wherein the prompt provides an indication that an automated transfer event will occur a predetermined amount of time after the first time with respect to a credit meter being used to conduct the gaming session at the gaming device, wherein the credit meter comprises a device that stores information related to automated transfer events;
track an elapsed time relative to the first time;
determine that the elapsed time equals the predetermined amount of time;
automatically implement the automated transfer event in response to determining that the elapsed time equals the predetermined amount of time; and update the credit meter to indicate an account to which credits were transferred during the automated transfer event, an amount of credits transferred during the automated transfer event, and that the automated transfer event occurred automatically as compared to being a manual transfer event.

20. The system of claim 19, wherein the predetermined condition comprises determining that a game outcome has occurred during the gaming session, wherein the predetermined condition further comprises determining that the game outcome has caused a value stored in the credit meter to fall below a predetermined threshold, wherein the automated transfer event comprises increasing the value stored in the credit meter by a player-defined value, and wherein the automated transfer event further comprises decrementing a player account by an amount equal to the player-defined value after the value stored in the credit meter is increased by the player-defined value.

* * * * *